United States Patent [19]
Calhoun et al.

[11] Patent Number: 5,628,428
[45] Date of Patent: May 13, 1997

[54] AUTOMATED FEEDER SYSTEM AND APPARATUS

[76] Inventors: Jeffrey E. Calhoun, 150 Overlook Ave., Apt. 2V, Peekskill, N.Y. 10566; Daniel A. Peragine, Jr., 136 Park Ave., Mount Vernon, N.Y. 10550; Emil Scordato, 18 Lake Shore Dr., Eastchester, N.Y. 10709; Gary C. Helstern, 28 Peacable St., West Redding, Conn. 06896

[21] Appl. No.: 467,458

[22] Filed: Jun. 6, 1995

Related U.S. Application Data

[62] Division of Ser. No. 64,853, May 20, 1993, Pat. No. 5,511,690.

[51] Int. Cl.⁶ ........................................... B65H 1/00
[52] U.S. Cl. ........................... 221/197; 221/312 A
[58] Field of Search .......................... 221/197, 312 A, 221/282, 289, 186; 206/445, 493; 294/27.1

[56] References Cited

U.S. PATENT DOCUMENTS

| | | | |
|---|---|---|---|
| 892,688 | 7/1908 | Schrum | 194/251 |
| 2,099,267 | 11/1937 | Hackett | 312/66 |
| 2,529,222 | 9/1950 | Mackibbin | 312/64 |
| 4,109,825 | 8/1978 | Weitzman | 221/14 |
| 4,220,415 | 9/1980 | Staab et al. | 356/433 |
| 4,371,498 | 2/1983 | Scordato et al. | 422/102 |
| 5,167,327 | 12/1992 | Mondelle | 221/312 A |
| 5,250,440 | 10/1993 | Kelln et al. | 436/48 |

FOREIGN PATENT DOCUMENTS

| | | | |
|---|---|---|---|
| 821955 | 10/1959 | United Kingdom | 221/312 A |
| 2273924 | 6/1994 | United Kingdom | |

*Primary Examiner*—Kenneth Noland
*Attorney, Agent, or Firm*—Wolf, Greenfield & Sacks, P.C.

[57] ABSTRACT

A feeder system for sequentially supplying a plurality of cuvettes or other objects to a conveyor track. The system includes a cassette, an escapement, and an actuator. The cassette retains the objects/cuvettes in at least one substantially vertical stack over the conveyor. The escapement is movable between a first position in which the escapement supports the bottom object in the stack, a second middle position in which the escapement supports both the bottom object and the object above it and a third position in which the escapement continues to support the object in said stack above the bottom object and releases the bottom object to be deposited on the conveyor. The actuator moves the escapement between the first, second and third positions. Novel apparatus for use in the system, including a stick for loading cuvettes into a cassette and a cuvette particularly adapted for stacking, are also provided.

2 Claims, 17 Drawing Sheets

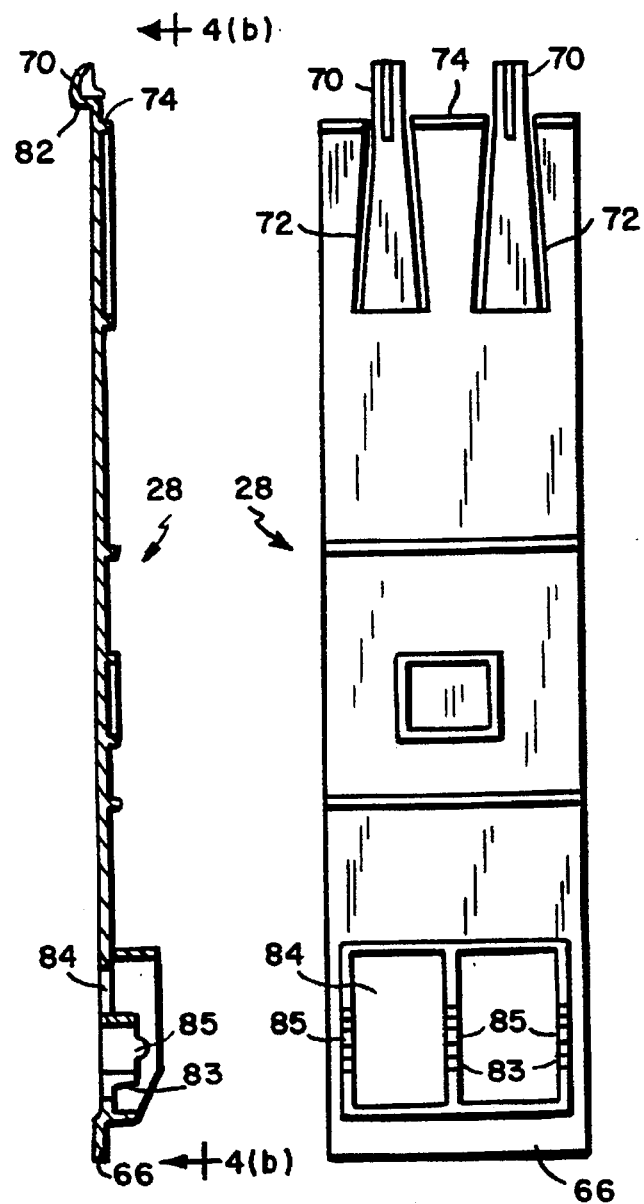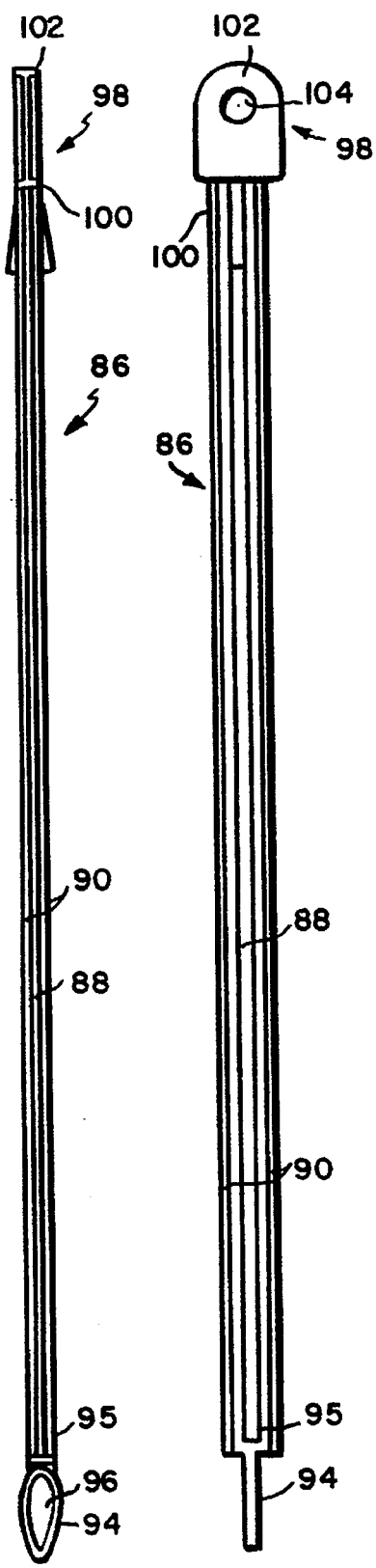
FIG.4(a)  FIG.4(b)
FIG.5(a)  FIG.5(b)

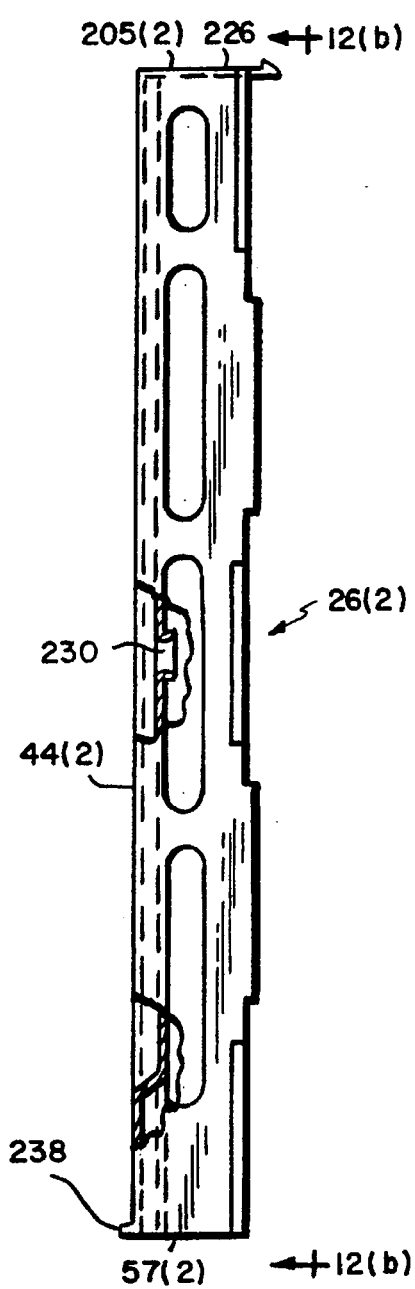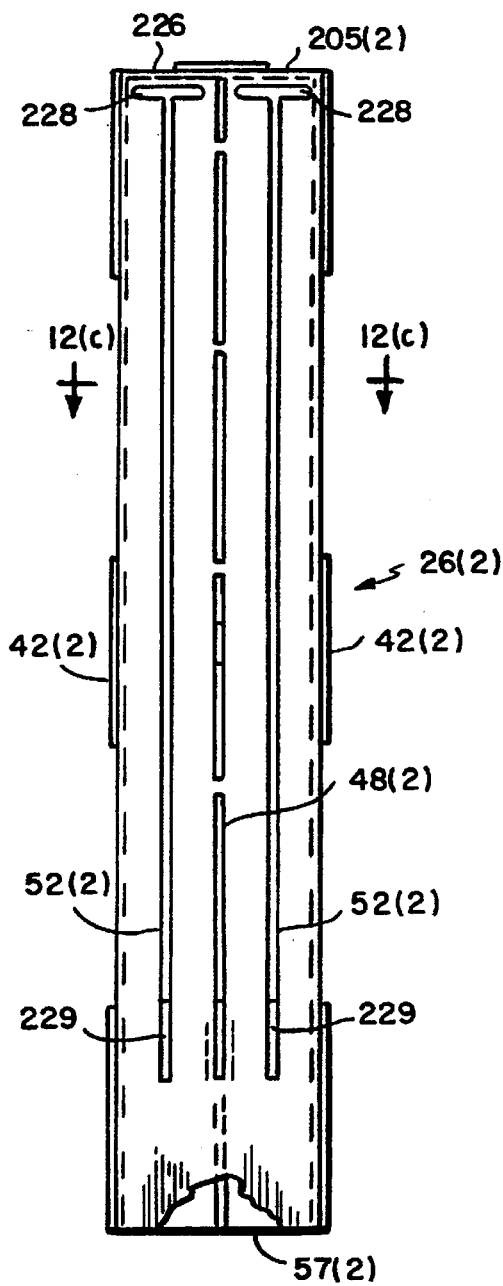
FIG.12(a)
FIG.12(b)
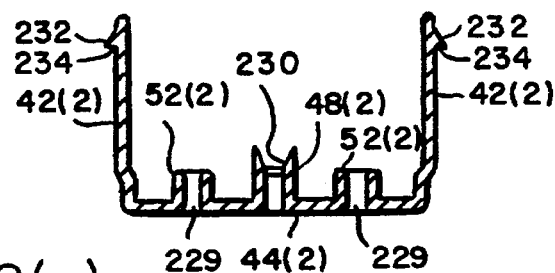
FIG.12(c)

AUTOMATED FEEDER SYSTEM AND APPARATUS

This application is a divisional of application Ser. No. 08/064,853, filed May 20, 1993, entitled AUTOMATED FEEDER SYSTEM AND APPARATUS and now U.S. Pat. No. 5,511,690.

FIELD OF THE INVENTION

This invention relates to automated feeder systems and more specifically to an automated feeder system for feeding cuvettes to a conveyor track and to apparatus for use therewith.

BACKGROUND OF THE INVENTION

Medical laboratories process and analyze hundreds of biological samples each day. Typically, the process and analysis of these samples involves placing a sample in a cuvette with a particular solution and then subjecting the sample to a photometric analysis. Once the testing is completed, the cuvette with the analyzed sample is discarded. To process and analyze more samples each day, laboratories have sought ways to handle cuvettes more quickly (i.e. to handle more cuvettes within a given unit of time).

To increase cuvette throughput, and to decrease labor costs, medical laboratories have become increasingly automated. Thus, cuvettes have been mounted on a conveyor and passed through one or more fill stations and one or more analysis stations before being passed to a disposal station, the entire operation being computer controlled. However, one area of the operation which has proved difficult to automate has been the feeding of cuvettes in the conveyor.

The small size, irregular shape and delicate nature of the cuvettes makes them difficult to handle quickly while still having each cuvette precisely oriented in the conveyor. More particularly, each cuvette comprises one or more small riles or wells, typically formed of plastic or glass, which may be joined together at one end. The inside of each cuvette must be kept clear from contamination and the outside of each cuvette, at least in the area where photometric analysis is to be performed, must be kept clear from scratches. Cuvettes which are contaminated or damaged cannot be used.

The current technique generally employed for feeding cuvettes to a conveyor is an automated hopper system. Such a system has a hopper in which the cuvettes are loaded. Once loaded, the hopper is spun, vibrated or otherwise agitated to jostle the cuvettes into a desired orientation. The hopper has a drop slot located over the conveyor which is shaped to only permit properly oriented cuvettes to pass through. When a cuvette is jostled into a properly oriented position over the slot, the cuvette drops through onto the conveyor belt.

Such hopper systems have a number of problems. First, the feeding of cuvettes is somewhat random, limiting the predictable feed rate of the system. Second, the cuvettes in the hoppers are frequently contaminated by dust and dirt which accumulates in the hopper. Third, the cuvettes in the hopper are frequently scratched from the jostling between cuvettes during agitation. Fourth, such jostling can also cause cuvettes to break, such breaks frequently causing the system to jam. Finally, the cuvettes in a hopper have a tendency to pick up static electricity, which causes the cuvettes to stick to the walls of the system and also causes jams.

Problems such as those described above can also arise in other situations, such as in automated assembly of products, where it is desired to feed small, irregular, and fragile parts or other objects onto a conveyor.

Another technique currently employed for supplying cuvettes to a medical instrument is to mount 20 to 100 in a circular tray which is installed in the instrument by an operator at the beginning of each run. The trays used in this technique add a large amount of biocontaminated plastic to the waste stream, significantly increasing disposal costs. This technique can also waste time and/or cuvettes, particularly in the situation where the operator has only a few unused cuvettes left in the current tray and wants to start a large run. The operator either has to come back to the instrument in a few minutes or discard the unused cuvettes.

Accordingly, an object of this invention is to provide a system for more rapidly and reliably feeding objects to a conveyor.

A more specific object of this invention is to provide a cuvette feeder system which minimizes the number of cuvettes wasted by among other things minimizing the possible contamination of cuvettes and minimizing possible damage to the cuvettes.

Another object of this invention is to provide a cuvette feeder system which minimizes jams caused by mechanical failures, static electricity buildup, cuvette breakage and random error.

Another object of this invention is to provide a system for feeding objects to a conveyor, which system is easy to load and operate, including improved apparatus for use in such system.

Other objects and advantages will become apparent from the following description of the invention.

SUMMARY OF THE INVENTION

In accordance with the above, this invention provides a feeder system for sequentially supplying a plurality of cuvettes or other objects to a conveyor. The system includes a cassette or other means for retaining the plurality of objects in at least one substantially vertical stack over the conveyor, an escapement for each stack which is movable between a first position in which the escapement supports the bottom object in the stack and a second position in which the escapement supports the object in the stack above the bottom object and releases the bottom object to be deposited on the conveyor and an actuator for driving the escapement between its first and second positions. For preferred embodiments, a third position is also provided for the escapement between the first and second positions, the escapement supporting both the bottom object in the stack and the object above the bottom object when in the third position.

For preferred embodiments, the objects are cuvettes which are stacked in one or more channels of a cassette mounted over the conveyor. The cassettes are preferably formed of a channel member having a base and side walls extending therefrom and a cover secured to the sides of the channel member, with either the channel member or cover having an opening through which the escapement may enter the channel. The cassette may be detachably connected to the feeder system, with loaded cassettes being mounted to the system and empty cassettes being removed, or a means may be provided for loading cuvettes or other objects to the system.

For preferred embodiments, loading is accomplished utilizing a carrier stick for detachably retaining cassettes for insertion into a channel, the channel including a means for stripping cassettes from the stick as the stick is removed from the channel. Where the cuvettes are dual cuvettes having a pair of adjacent vials attached to each other at one end by a bridge with there being a selected space between adjacent walls of the vials, the stick may be adapted to fit between such adjacent walls of each cuvette mounted thereon and to frictionally engage such walls to hold the cuvette in place. For a preferred embodiment, the stick has an elongated shaft and a means extending from the shaft along at least the length thereof to which cuvettes are to be mounted for frictionally engaging the adjacent walls of each cuvette mounted on the stick. A handle is provided at one end of the shaft and a temporary restraining tip at the opposite end of the shaft. More particularly, the means for frictionally engaging may be at least one projection extending from each side of a substantially flat shaft toward one of the adjacent walls. For most preferred embodiments, at least one of the adjacent walls has an indentation formed therein with the stick having a means for coacting with such indentation to provide a snap-fit between the stick and the cuvette mounted thereon.

For preferred embodiments, the escapement includes a lever having a first arm and a second arm and pivoting about a point near the junction of the arms as the escapement moves between the first and second positions. The first arm supports the bottom object when the escapement is in the first and third position and guides the release of the bottom object for the second position. The second arm engages the actuator. The escapement may also include a spring member connected to the lever for supporting the object above the bottom object when the escapement is in the second and third positions.

A follower may be positioned in each channel for permitting objects therein to move down the stack, but for inhibiting movement of objects in the opposite direction. Enhanced feeding may also be accomplished by utilizing a cuvette having at least one vial which is defined by four side walls and a bottom wall, two of the side walls being stacking walls, the outer surfaces of which are adapted to be in contact with corresponding outer surfaces of adjacent cuvettes when the cuvettes are stacked for feeding. At least one bulge is formed on the same outer surface of at least one stacking wall for each vial to provide a selected spacing between adjacent cuvettes in the stack. For preferred embodiments, each outer surface of each vial has at least one bulge formed thereon, with each bulge preferably having a textured surface as the surface which is adapted to be in contact with a surface of an adjacent cuvette. Each of the bulges has an extent along the corresponding outer surface in a top bottom direction, with the combined extent of the bulges formed on each outer surface in the top bottom direction being sufficient to prevent wobble of the stacked cuvettes in such direction.

In an alternative embodiment, either or both types of cassettes may be housed on a rotating turret or other cassette moving mechanism. The turret may be rotated to move loaded cassettes into position over the conveyor as needed.

BRIEF DESCRIPTION OF THE DRAWINGS

For a full understanding of the nature and objects of the invention, reference should be had to the following detailed description taken in conjunction with the accompanying drawings, in which:

FIG. 4(a) is a side sectional view of a cover for the channel member shown in FIG. 3(a).

FIG. 4(b) is a front view of the cover taken generally along line 4—4 in FIG. 4(a).

FIG. 5(a) is a side view of a carrier stick usable with the cuvette feeder system shown in FIG. 1.

FIG. 5(b) is a front view of the carrier stick taken generally along line 4—4 in FIG. 5(a).

FIG. 12(a) is a side view of a channel member for a cassette suitable for use in the cuvette feeder system shown in FIG. 11.

FIG. 12(b) is a front view of the channel member taken along line 6—6 in FIG. 12(a).

FIG. 12(c) is a top view of the channel member taken along line 7—7 in FIG. 12(b).

DETAILED DESCRIPTION

Figure 1:
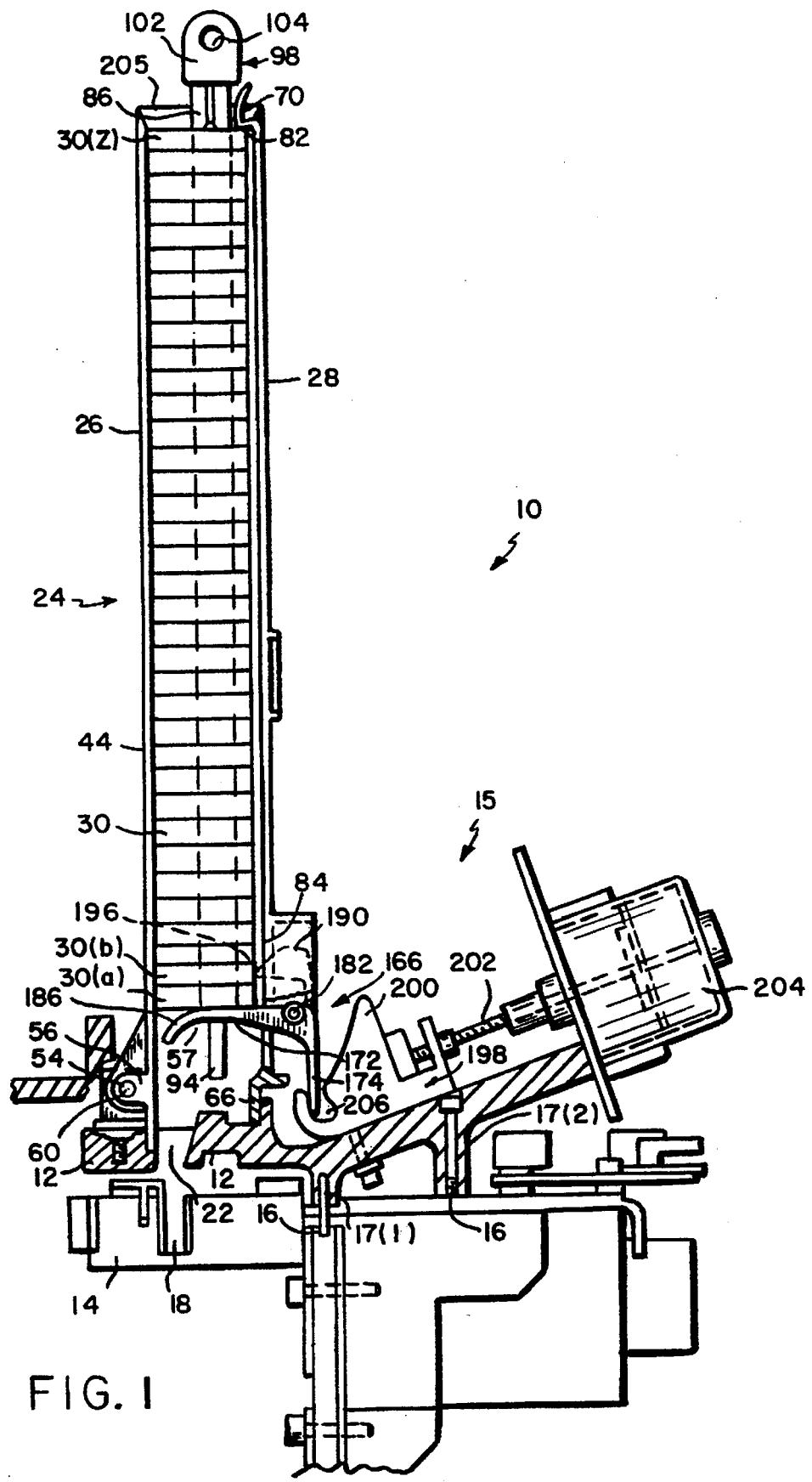
FIG. 1 is a cross-sectional side view of a cuvette feeder system in accordance with a first embodiment of the invention.
Figure 2:
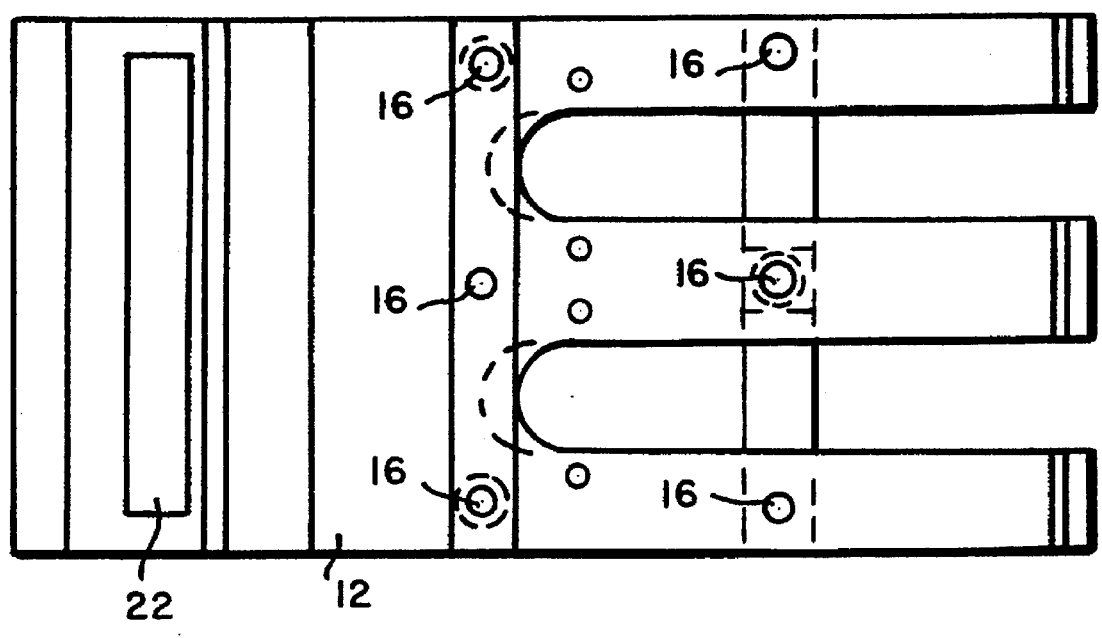
FIG. 2 is a top view of a bracket suitable for use in the cuvette feeder system shown in FIG. 1.

FIG. 1 is a cross-sectional side view of a feeder system in accordance with a first embodiment of the invention. The system will be described with respect to FIG. 1, with reference to FIGS. 2–8 to illustrate various features of different parts for the system and to FIGS. 9(a)–10(c) to illustrate the operation of the system.

Referring first to FIG. 1, the system 10 has a block 14 with a conveyor channel 18 formed therein, a cassette 24 containing a stack of cuvettes 30(a),30(z) mounted over the conveyor 18 and a feeding mechanism 15 for controlling the feeding of cuvettes from cassette 24 to conveyor 18. A bracket 12 is secured to housing 14 by pins or screws 16. Bracket 12 has a substantially rectangular shape with a drop slot 22 on one side which is aligned over conveyor 18. In this embodiment, drop slot 22 has a rectangular shape (see FIG. 2 for a top view of the drop slot). The dimensions of drop slot 22 allow one cuvette 30 to drop through when the cuvette is vertically oriented.

Pins 16 connect the bottom of bracket 12 to the top of the housing 14. Sleeves 17 are seated over the pins to control the spacing between housing 14 and the right or rear end of bracket 12, supporting the end of the bracket at an angle of approximately 10% to the housing. The left sleeves 17(1) are integrally formed with the bracket 12 and are shorter than the right sleeves 17(2). The top of sleeves 17(2) are sloped so that when the pins 16 secure the bracket 12 to the housing 14, the top of sleeves 17(2) are flush with the bottom of bracket 12.

Cassette 24, which is connected to bracket 12, includes a trough-shaped housing or channel member 26 and a cover 28. The cassette 24 stores cuvettes in at least one substantially vertical row over drop slot 22. The cuvettes may be single cuvettes, dual cuvettes 30 as shown, or other cuvette structures. As discussed above, objects other than cuvettes may be loaded in a suitable cassette for other applications. For a preferred embodiment, cassette 24 stores two rows of thirty-five dual cuvettes each. The second row of dual cuvettes 30 is disposed behind the first (as viewed in FIG. 1).

Cassette 24 and cuvettes 30 are preferably made from the same materials (or at least materials which are electrostatically compatible) to avoid the buildup of static electricity which could cause jams in the system. For a preferred embodiment, cassette 24 and dual cuvettes 30 are both made from polystyrene plastic.

Figure 3A:
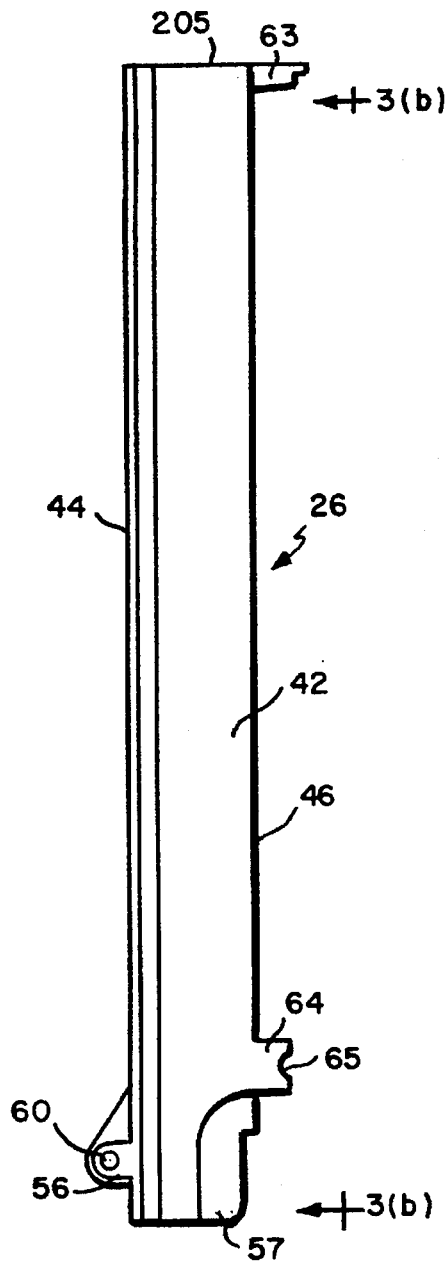
FIG. 3(a) is a side view of a channel member for a cassette suitable for use in the cuvette feeder system shown in FIG. 1.
Figure 3B:
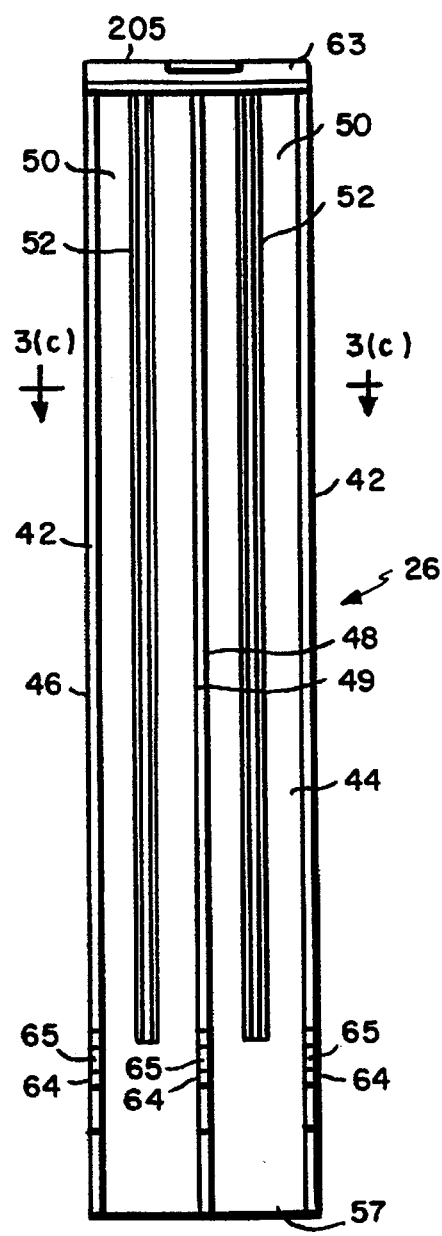
FIG. 3(b) is a front view of the channel member taken generally along line 2—2 in FIG. 3(a).
Figure 3C:
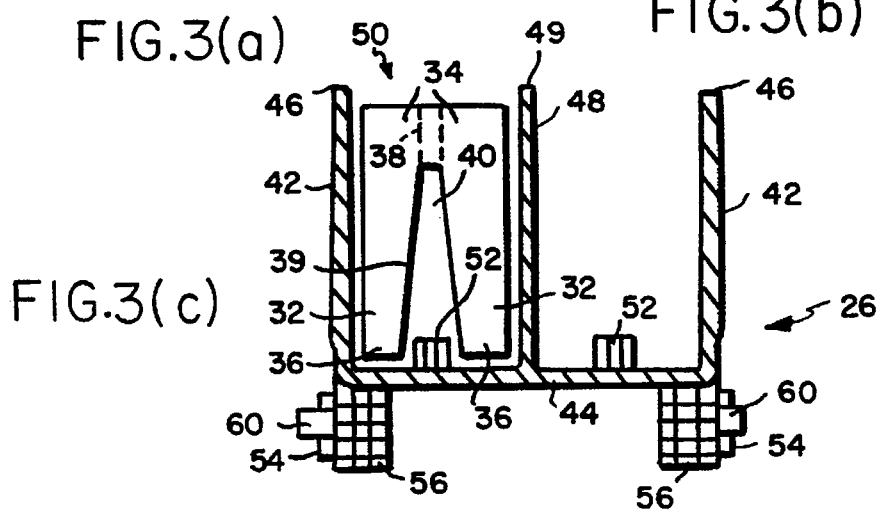
FIG. 3(c) is a top view of the channel member taken generally along line 3—3 in FIG. 3(b).
Figure 5C:
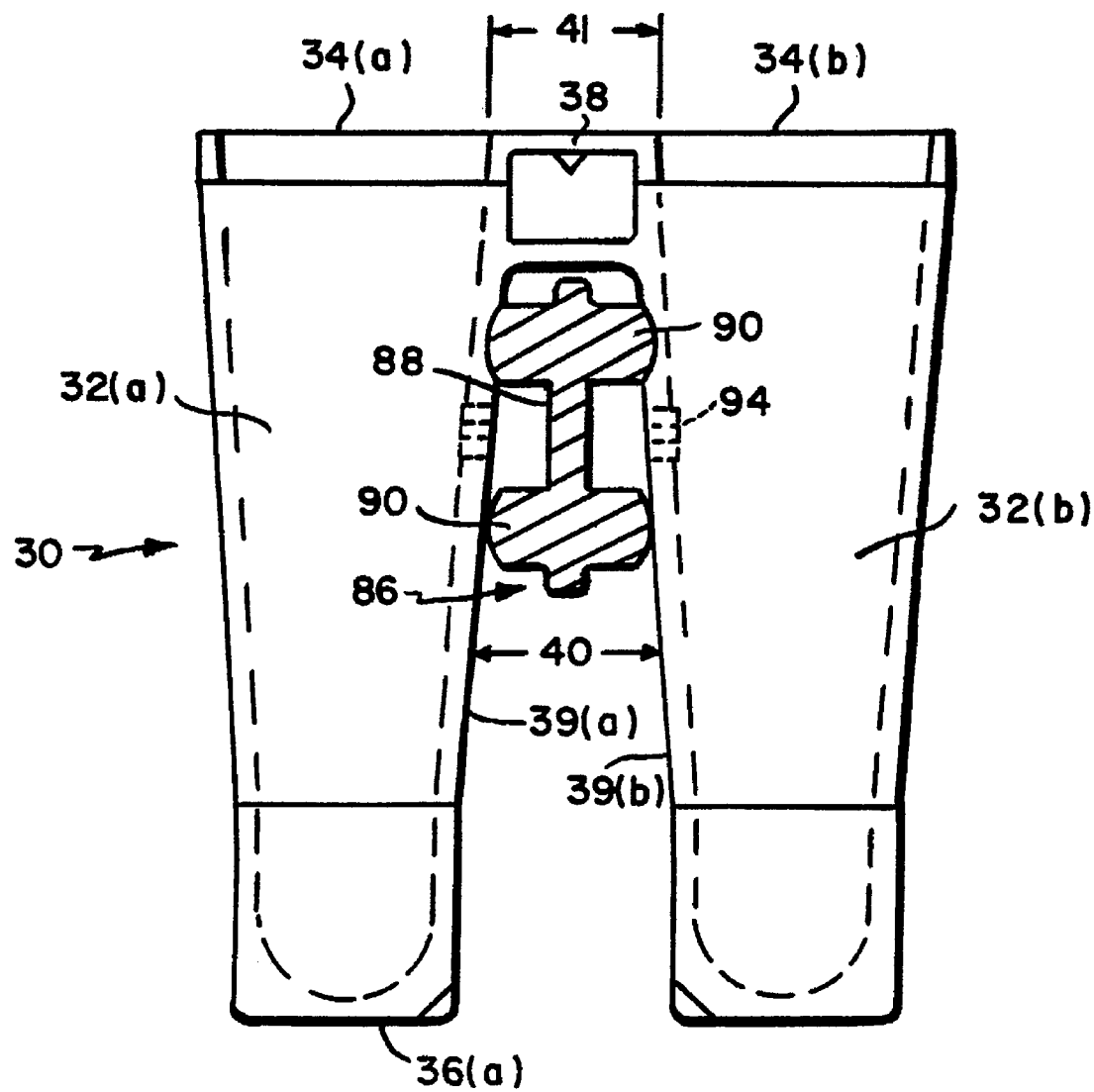
FIG. 5(c) is a top view of a cuvette seated on a carrier stick looking generally along line 5—5 in FIG. 5(b).

Each dual cuvette 30 is formed from a pair of vials or wells 32, each with an open end 34 and closed end 36 [see FIG. 3(c)]. The vials 32 are connected by a bridge 38 adjacent each open end 34. A gap 40 is defined between the inner walls 39 of the vials 32 and with a pair of radiased indentations being provided beneath the bridge 38 to provide an enlarged gap 41 therebetween. The function of enlarged gap 41 will be discussed later.

FIGS. 1 and 3(a)–3(c) are various views of channel member 26 which forms part of cassette 24. A pair of elongated side walls 42 are each connected to a base 44 to form the channel member. When the channel member is filled with dual cuvettes 30, closed ends 36 of the cuvettes are seated against base 44 in channel member 26. The outermost edge 46 of each of the side walls 42 is located further out from the base 44 than the height of the cuvettes seated in the channel member.

A guard or lip 63 projects forward from the top of member 26. Guard 63 is connected at each end to the outermost edge 46 of each side wall 42 and extends out and around. The function of guard 63 will be discussed in greater detail later.

Channel member 26 also has a divider wall 48 connected to the base 44, extending substantially parallel to side walls 42 and substantially perpendicular to base 44. The outermost edge 49 of the divider wall 48 extends out as far as the outermost edge 46 for side walls 42. The channel member may have more than one divider wall 48 if more than two rows of cuvettes are to be stacked in the cassette.

Divider wall 48 splits the housing 26 into two channels 50. Each channel 50 receives one row of cuvettes along the length of the channel and may also include a track 52 connected to base 44 along a portion of the length of the channel. When the dual cuvettes 30 are loaded into one of the channels 50, closed ends 36 of each cuvette are located on opposite sides of track 52, tracks 52 being large enough to guide the dual cuvettes along each channel 50, without interfering with the movement of the cuvettes.

Channel member 26 is pivotally connected to bracket 12 by a pair of hinges 54 (FIG. 1) adjacent one side of the drop slot 22. One part 56 of each hinge is connected to the base 44 near its lower end and the other part of each hinge 54 is connected to bracket 12. A pin 60 in each hinge 54 completes the pivotal connection between the two hinge parts.

Channel member 26 also has three rectangular-shaped tabs 64, each with a semi-circular groove 65 formed in its forward end, the tabs 64 extending from the lower end of each side wall 42 and from divider wall 48. More specifically, one edge of the tabs 64 is connected to the outermost edge 46, 49 of each side wall 42/divider wall 48 and extends out from the wall. The groove 65 in each tab 46 is on the outermost edge of the tab. For reasons to be discussed later, the left-most groove 65 is smaller than the other two grooves, which are substantially identical.

FIGS. 1 and 4(a)–4(b) are various views of the elongated cover 28. The bottom end 66 of the cover 28 is located on the opposite side of drop slot 22 from the hinges 54 when the cassette is in its operative position shown in FIG. 1 and rests against the top of bracket 12. Cover 28 extends up from the bracket 12 in a substantially vertical direction, spanning the length and width of channel member 26 and being sealed to the channel member. Outside vertical edges of the cover 28 are sealed to the outermost edges 46 of the side walls 42 and the outermost edge 49 of the divider wall 48. When cuvettes are in the cassette, the open ends 34 and the bridges 38 of cuvettes 30 face the cover, the cover thus preventing dirt and dust from entering and contaminating the cuvettes.

Cover 28 has a catch 70 for each channel 50 which catches are used in a manner to be described later when cuvettes 30 are loaded into cassette 24. Each catch 70 is located within a corresponding slot 72. The lower end of each catch 70 is connected to the base of one of the slots 72. A lip 82 is formed on the upper end of each catch 70 and extends into the corresponding channel 50. Each lip 82 is designed to engage with the side of the top cuvette 30(z) in each cuvette stack, the catches 70 being pushed out of the way into the cassette 24. Catches 70 are protected by guard 63 which surrounds the upper ends of the catches to prevent the catches from being accidentally snapped off.

Cover 28 also has a substantially rectangular opening 84 adjacent its bottom end 66 for each channel 50. Each opening 84 provides access to the bottom cuvettes 30 in the corresponding channel 50.

A rectangular recess 83 with a semi-circular indent at its rear is formed along each outside vertical edge of the cover and along the center of cover 28 near the bottom edge 66. The recesses 83 with indents 85 align with the tabs 64 with the grooves 65, each tab 64 fitting in the corresponding recess when the cover 28 is sealed to the housing 26. Each pair of grooves 65 and indents 85 form a full circle with the left-most circle being smaller than the other two circles.

FIGS. 1 and 5(a)–5(c) are various views of a carrier stick 86 used to detachably retain cuvettes 30 in a row for loading into one of the channels 50 of cassette 24. In this preferred embodiment, the stick 86 is formed from a flat elongated shaft 88 with a pair of opposing projections 90 extending along the length of the shaft on each side. The combined width of each pair of opposing projections 90 is wider than the gap 40 for each dual cuvette 30, but is roughly equal to the enlarged gap width 41. Dual cuvettes 30 are loaded onto stick 86 by placing each dual cuvette 30 over the stick and then snapping the cuvette down onto the stick, walls 39 being pushed apart slightly by the forward pairs of projections 90 until this forward pair of projections fits into gap 41, permitting walls 39 to snap back into the position shown in FIG. 5C to detachably retain the cuvettes on the stick. For a preferred embodiment, up to thirty-five dual cuvettes 30 may be loaded onto stick 86. Other possible embodiments for the carrier stick are described later with reference to FIGS. 6(a)–6(f).

Carrier stick 86 also includes a deformable retaining tip 94, which is formed to one end of the stick and a handle 98 formed to the other end of the stick. Tip 94 is wider than the gap 40/41 and prevents dual cuvettes 30 from sliding off the stick. The tip deforms when pushed or pulled through the gap 40/41 of each cuvette 30 to detach the cuvettes from the stick. In this embodiment, the retaining tip 94 has a substantially oval shape, which is wider than the gap 40 and a hollow center 96 which allows the tip 94 to deform. Other possible embodiments for the tip 94 are described later with reference to FIGS. 7(a)–7(c).

The handle 98 is used to carry and manipulate the carrier stick. In this embodiment, handle 98 is a flat member 102 which extends from the end 100 of the stick and has a finger opening 104 formed therein. Another possible embodiment for the handle 98 is described later with reference to FIG. 8.

Figure 6A:
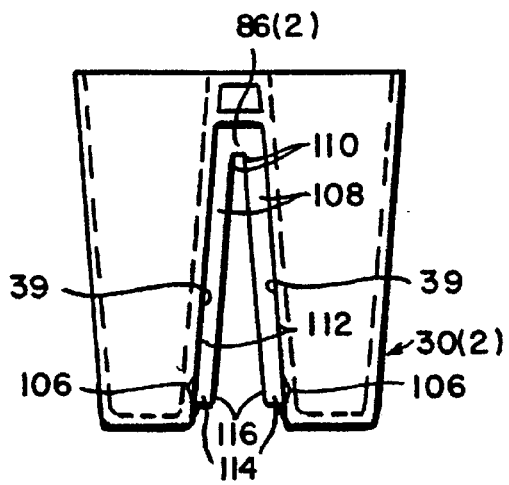
FIG. 6(a) is a top view of a modified dual cuvette engaged on a second embodiment for the carrier stick.

FIG. 6(a) illustrates a modified dual cuvette 30(2) engaged on a second embodiment for the carrier stick 86(2). Cuvette 30(2) is modified to have groove 106 formed on each inner wall 39 adjacent the closed end 36. Carrier stick 86(2) is in the form of an elongated wedge or V with a pair of elongated arms 108, which are connected to each other along one elongated edge 110. The outer surface 112 of each arm 108 has a ridge 114 formed along the length of the arm. Each ridge 114 is adjacent the corresponding elongated edge 116, the distance between the edges 116 being wider than the gap 40 for the cuvette 30(2). When the cuvette 30(2) is pushed onto stick 86(2), the inner walls 39 push the arms 108 towards each other and the ridges 114 are seated into the corresponding grooves 106 to detachably retain the cuvette.

Figure 6B:
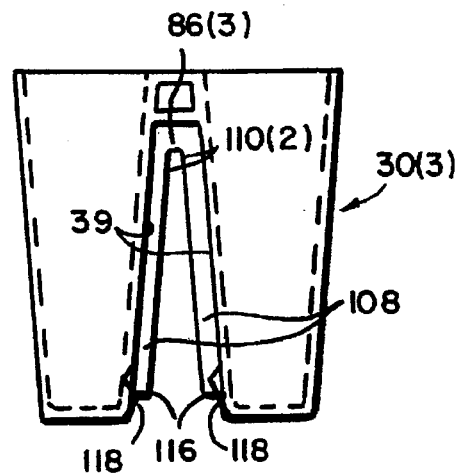
FIG. 6(b) is a top view of a modified dual cuvette engaged on a third embodiment for the carrier stick.

FIG. 6(b) is a cross-sectional view of another modified dual cuvette 30(3) engaged on a third embodiment 86(3) for the carrier stick. A ridge 118 is formed on the inner wall 39 near each closed end 36 of cuvette 30. The carrier stick 86(3) is V-shaped, like the embodiment of FIG. 6(a), with the elongated arms 108 being connected to each other along one of the elongated edges 110. The distance between the elongated edges 116 is wider than the gap 40 for the dual cuvette 30(3). When the cuvette 30(3) is pushed onto stick 86(3), the inner walls 39 push arms 108 towards each other and the elongated edges 116 are seated on the ridges 118 to detachably retain the cuvette.

Figure 6C:
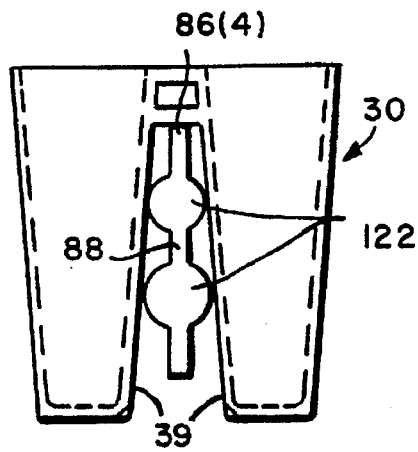
FIG. 6(c) is a top view of a dual cuvette engaged on a fourth embodiment for the carrier stick.

FIG. 6(c) is a cross-sectional view of the dual cuvette 30 engaged on a fourth embodiment 86(4) for a carrier stick. Stick 86(4) is formed from an elongated flat member 88 and differs from stick 86 in that semi-circular projections 122 are substituted for rectangular projections 90. This embodiment otherwise functions in substantially the same way as the embodiment of FIGS. 3(a)–3(c).

Figure 6D:
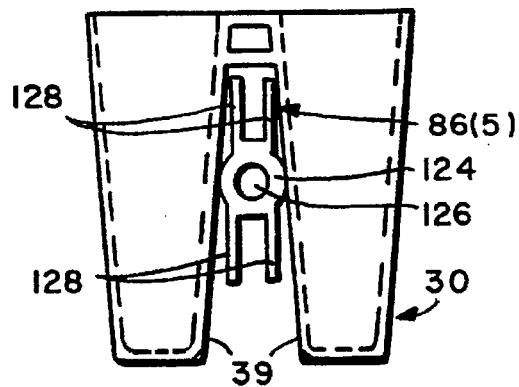
FIG. 6(d) is a top view of a dual cuvette engaged on a fifth embodiment for the carrier stick.

FIG. 6(d) is a cross-sectional view of the cuvette 30 engaged on a fifth embodiment 86(5) for the carrier stick. The stick 86(5) is formed from a rod 124 with a hollow core 126. Rod 124 has two pairs of opposing fins 128 which extend along the length of the rod. When the cuvette 30 is pushed onto stick 86(5), inner walls 39 are pressed against and deform two of the fins 128 on the same side of the rod 124 and this, in conjunction with frictional contact between rod 124 and inner walls 39, detachably retains the cuvette on the stick. Walls 39 may be indented in the area adjacent rod 124 to provide the snap-fit previously described.

Figure 6E:
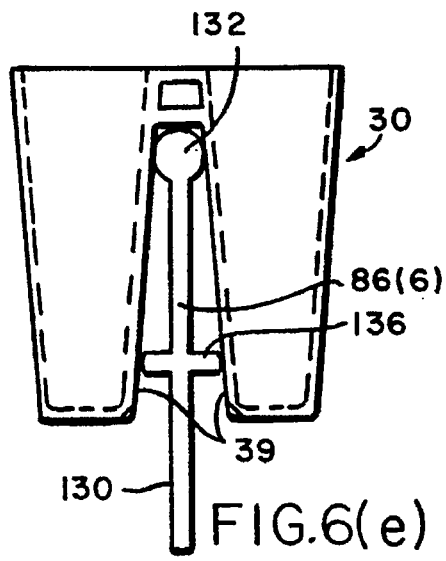
FIG. 6(e) is a top view of a dual cuvette engaged on a sixth embodiment for the carrier stick.

FIG. 6(e) is a cross-sectional view of the dual cuvette 30 engaged on a sixth embodiment 86(6) for the carrier stick. Carrier stick 86(6) is formed from an elongated rectangular member 130 with a circular end projection 132 along its top edge and a pair of opposing rectangular projections 136 near the center of the member. Projections 132 and 136 extend along the length of the member 130. When the cuvette 30 is pushed onto the stick 86(6), the inner walls 39 are pressed against the projections 132 and 136 to detachably retain the cuvette on the stick. Again, indentations may be provided adjacent projections 132 and/or 136 to facilitates snap-fit with stick 86(g).

Figure 6F:
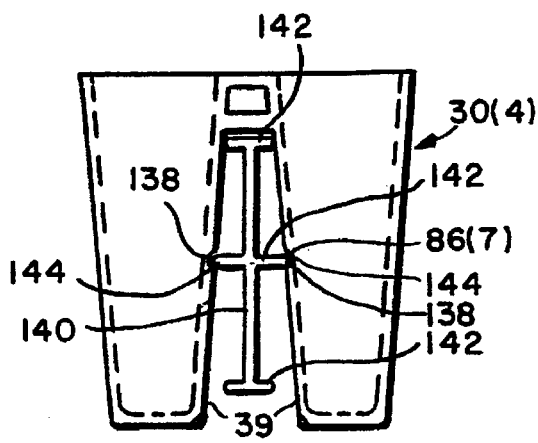
FIG. 6(f) is a cross-sectional view of a modified dual cuvette engaged on a seventh embodiment for the carrier stick.

FIG. 6(f) is a cross-sectional view of a modified dual cuvette 30(4) engaged on a seventh embodiment for the carrier stick 86(7). An indentation 138 is formed near the center of each inner wall 39 of cuvette 30. Carrier stick 86(7) is formed from a flat member 140 and three cross members 142, with one cross member 142 connected to each end of the flat member 140 and with the third cross member 142 connected to the center of the flat member 140. When cuvette 30(4) is pushed onto stick 86(7), the ends 144 of the center cross member 142 are pressed into the grooves 138. The width of the center cross member 142 is wider than the distance between the inner walls 39 below the grooves 138. As a result, the center cross member 142 detachably retains cuvette 30(4) on the stick.

Figure 7A:
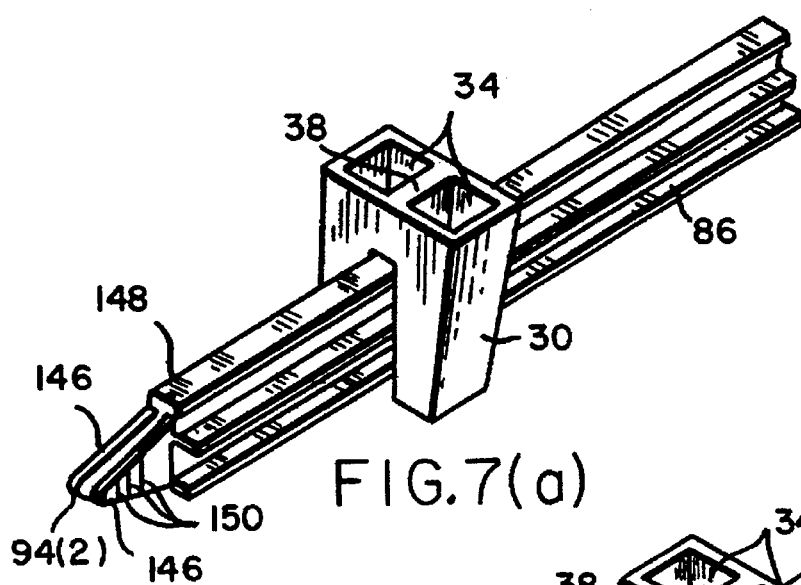
FIG. 7(a) is a fragmentary view of a second embodiment for a carrier stick retaining tip.

FIG. 7(a) illustrates a second embodiment 94(2) for the retaining tip. Tip 94(2) is formed from a pair of triangular shaped members 146 which extend away from each other at an angle from a common edge 148. The members 146 form a V-shaped tip, the outer ends of which are spaced by a distance greater than the gap 40 between cuvette walls. The outer surface of each member 146 has a series of serrations 150 which are substantially parallel to the connecting edge 148. When the tip 94(2) is pulled through the gap 40, the members 146 are deformed towards each other to release the cuvette 30 from stick 86.

Figure 7B:
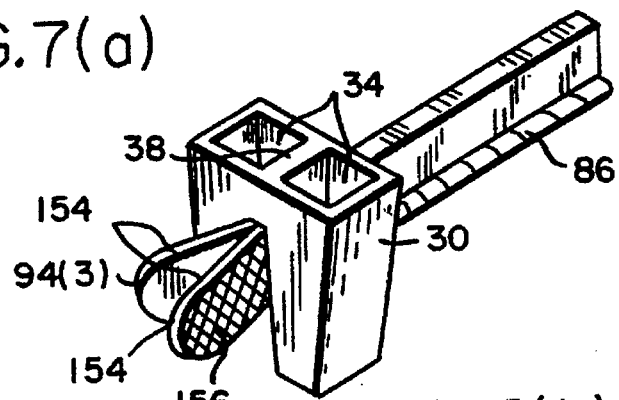
FIG. 7(b) is a fragmentary view of a third embodiment for a retaining tip.

FIG. 7(b) illustrates a third embodiment 94(3) for the retaining tip. Tip 94(3) is formed from a pair of oval-shaped members 154 which extend at an angle from a common edge. The members 154 form a V-shaped tip the outer ends of which are space by a distance greater than the gaps 40 and 41 between cuvette walls 39. The outer surface 156 of each member 154 is knurled. When tip 94(3) is pulled through the gap 40/41, the members 154 are deformed towards each other to release the cuvette from stick 86.

Figure 7C:
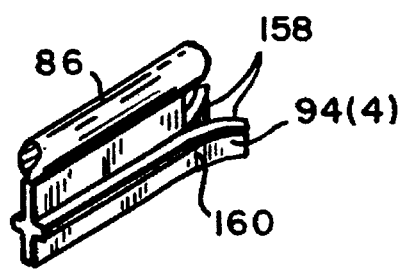
FIG. 7(c) is a fragmentary view of a fourth embodiment for a retaining tip.

FIG. 7(c) illustrates a fourth embodiment 94(4) for the retaining tip formed from a pair of rectangular-shaped members 158 which are connected to each other at an angle along edge 160. The members 158 form a V-shaped tip the outer ends of which are spaced by a distance greater than the gaps 40 and 41 between cuvette walls 39. When tip 94(4) is pulled through gap 40/41, the members 158 are deformed towards each other to release the cuvette from stick 86.

Figure 8:
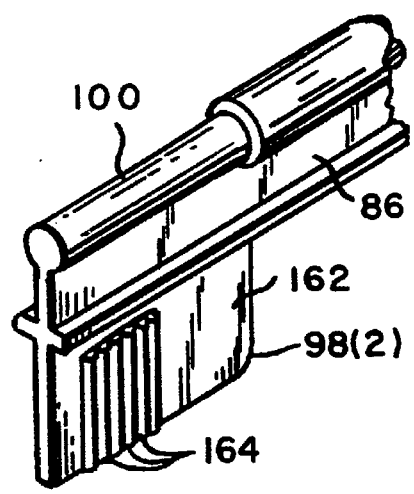
FIG. 8 is a fragmentary view of a second embodiment for a carrier stick handle.

FIG. 8 illustrates a second embodiment 98(2) for the handle. The handle 98(2) is a rectangular member 162 which is connected to the side of stick 86, near the outer end 100 thereof. A plurality of ribs 164 are formed on handle 98(2), which are substantially perpendicular to the stick 86 and help to grip the handle.

Referring back to FIG. 1, feed control mechanism 15 includes a pair of escapements 166 located adjacent the lower end of the housing 57, there being an escapement 166 for each channel 50, and an actuator 198 for each escapement.

Figure 10A:
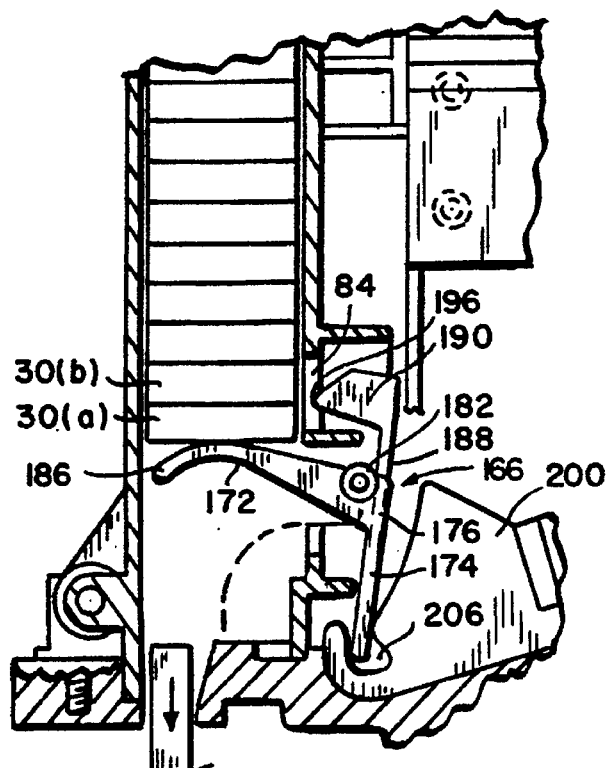
FIG. 10(a) is an enlarged fragmentary side sectional view of the cassette filled with cuvettes and the escapement in the first position for cuvette feeding.
Figure 10B:
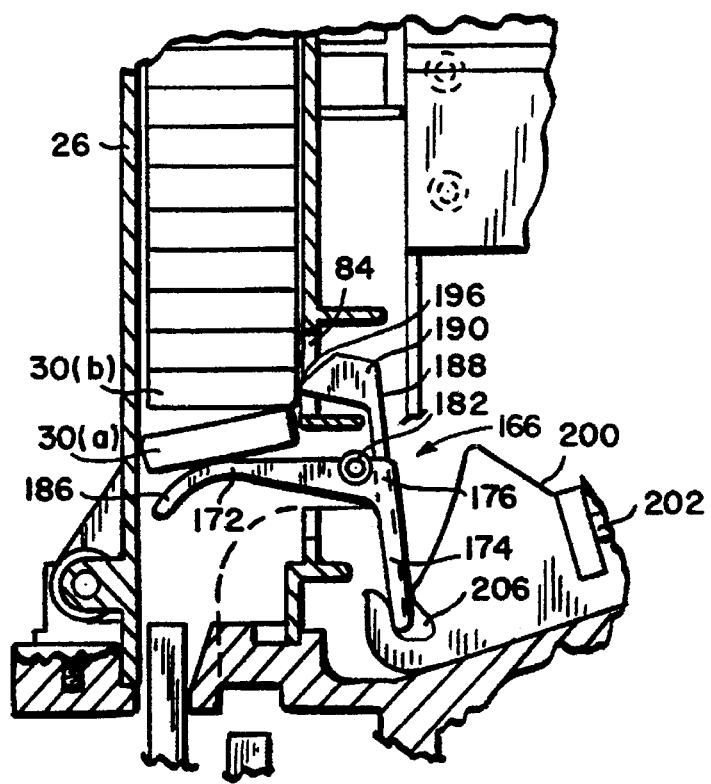
FIG. 10(b) is an enlarged fragmentary side sectional view of the cassette filled with cuvettes and the escapement in the second, middle position for cuvette feeding.
Figure 10C:
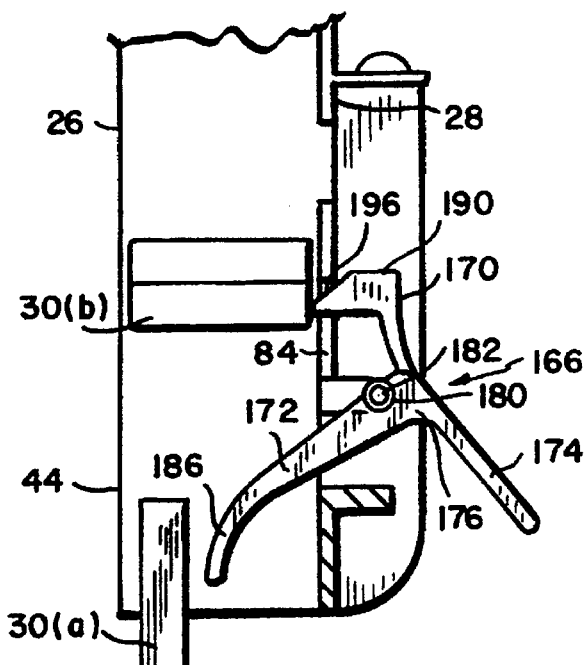
FIG. 10(c) is an enlarged fragmentary side sectional view of the cassette filled with cuvettes and the escapement in the third position for cuvette feeding.

As may be best seen in FIGS. 10(a)–10(c), each escapement 166 includes an L-shaped lever 168 and a spring 170. Each lever 168 includes a first finger 172 and second finger 174 extending at substantially right angles from an elbow junction 176. A hole 180 near junction 176 can accommodate a pin 182. Each lever 168 is pivotable about the corresponding pin 182. Left pin 182(1) has a smaller diameter than right pin 182(2), right pin 182(2) being hollow to permit the right end of left pin 182(2) to be fitted therein. The escapements are mounted in cassette 24 by capturing the left end of left pin 182(1) between groove 65 and 85 for the left wall of the cassette, capturing the enlarged left side of pin 182(2), with the smaller left pin 182(1) fitted therein, between grooves 65 and 85 for the center wall of the cassette and capturing the right side of right pin 182(2) between grooves 65 and 85 for the right cassette wall.

The other end of each first finger 172 extends through one of the openings 84 and across the channel member 26, almost reaching the base 44, the tip 186 at end finger 172 being sloped towards drop slot 22. The side of the bottom cuvette 30(a) rests on the top of finger 172. Second finger 174 extends down from the connection towards bracket 12.

Each spring 170 includes a finger 188 and a triangular head 190. One end of finger 188 is connected to lever 168 at junction 176. Finger 188, formed from a flexible material, extends up from junction 176 and is normally substantially perpendicular to finger 172. Triangular head 190 is connected to the side of the finger 188 at its upper end with its tip 196 extending toward one of the openings 84.

A pair of actuators 198 are connected to the bracket 12. Each actuator 198 includes an actuator hook 200, a lead screw 202, and a motor 204. A slot 206 is formed in the top of each actuator hook 200, the lower end of each finger 174 fitting into the corresponding hook slot. The bottom of hook 200 rests on the top side of bracket 12, with fingers of the bracket functioning as bearings on which the hook slides. The forward end of a lead screw 202 is connected to the rear side of hook 200 and the other end of each lead screw passes into corresponding motor 204. Motor 204 is secured to the top rear of bracket 12. When activated, the motor 204, which may for example be a stepper motor, is rotated in one direction to move lead screw 202, and hook 200 attached thereto, up or rearword along angled bracket 12, and is rotated in the opposite direction to move the lead screw and hook downward or forward along the bracket.

Figure 9A:
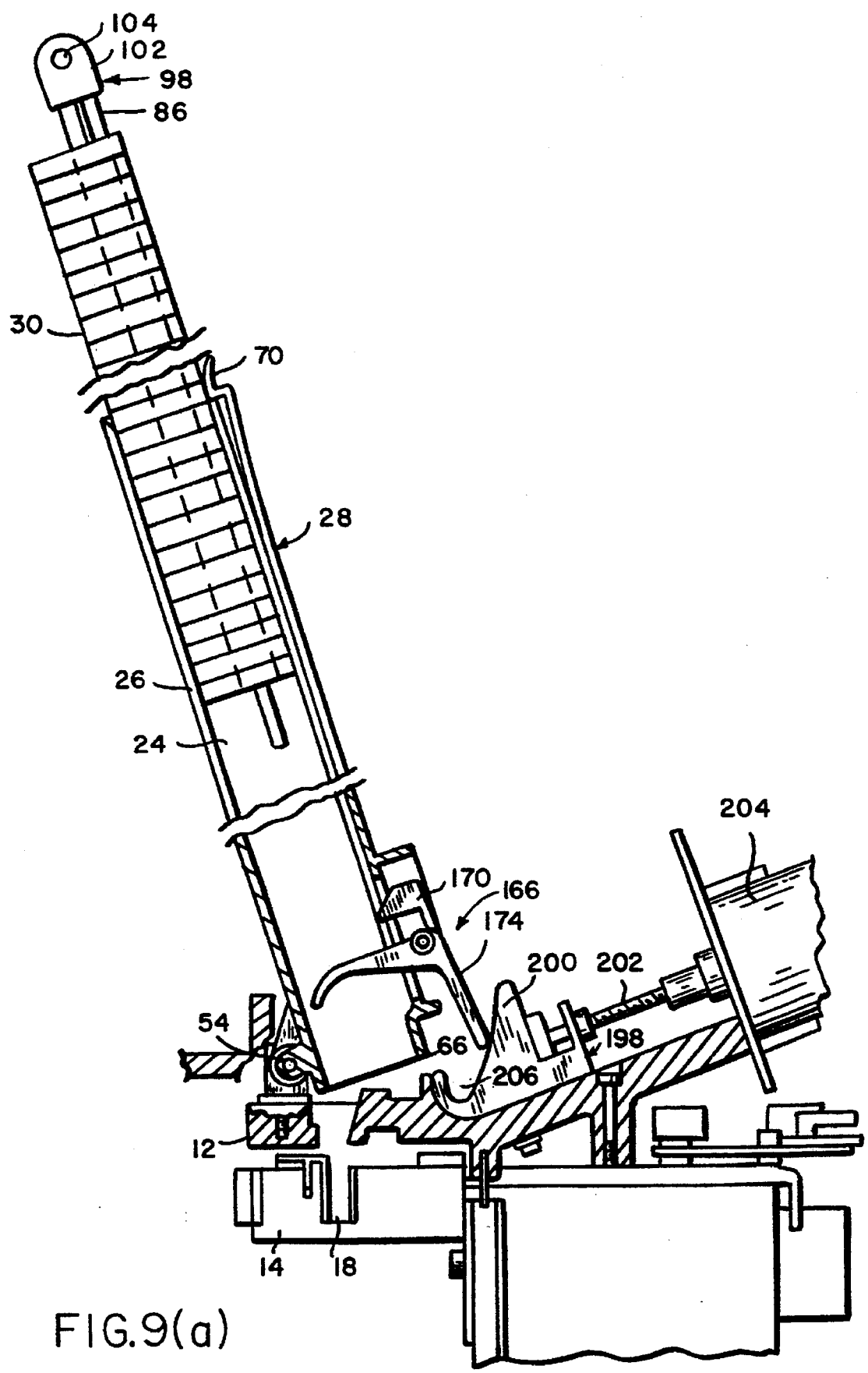
FIG. 9(a) is a side view partially in cross section of the cuvette feeder system in accordance with a first embodiment of the invention with a cuvette carrier stick being inserted into the cassette.
Figure 9B:
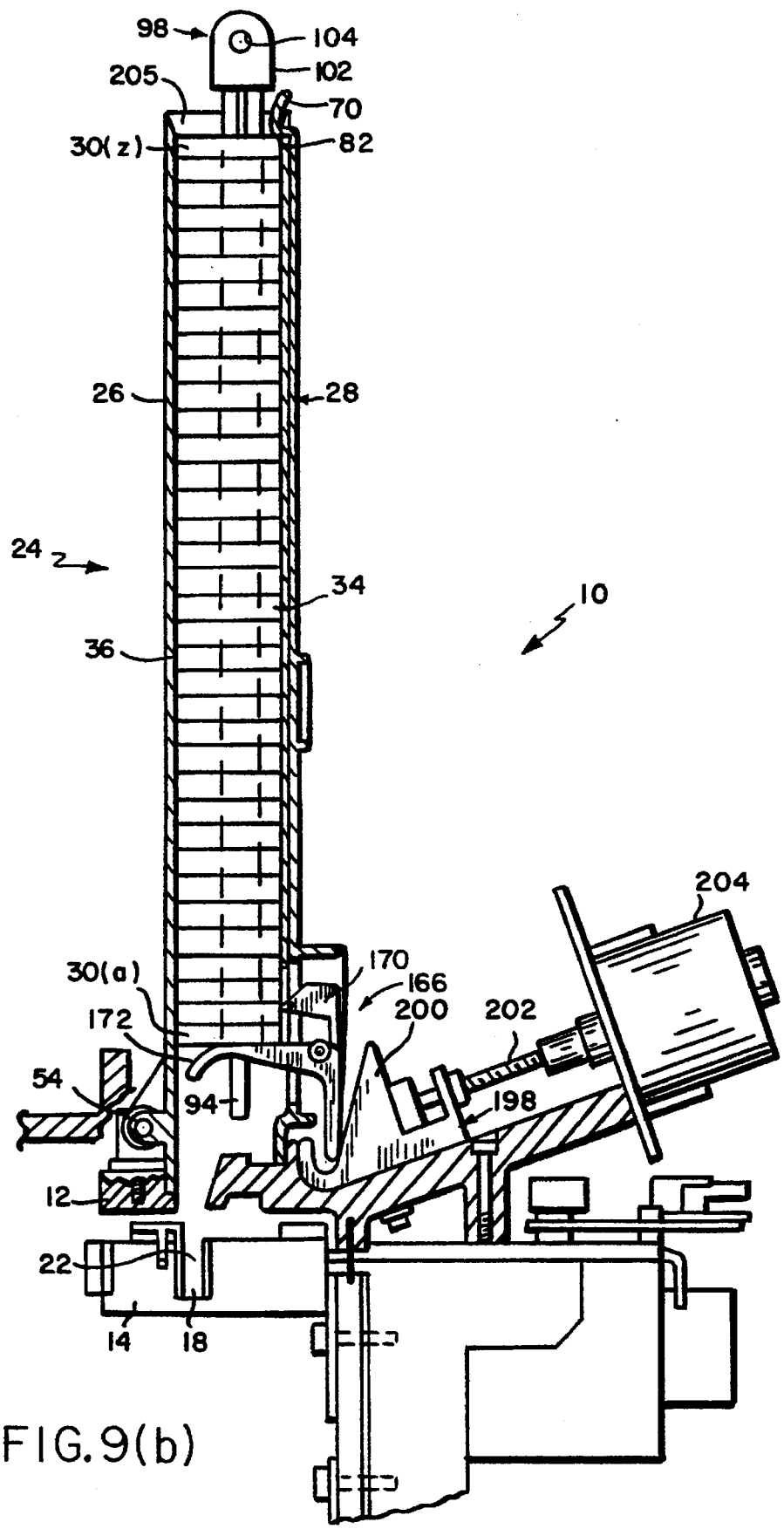
FIG. 9(b) is a side view partially in cross section of the cuvette feeder with the carrier stick fully inserted into the cassette.
Figure 9C:
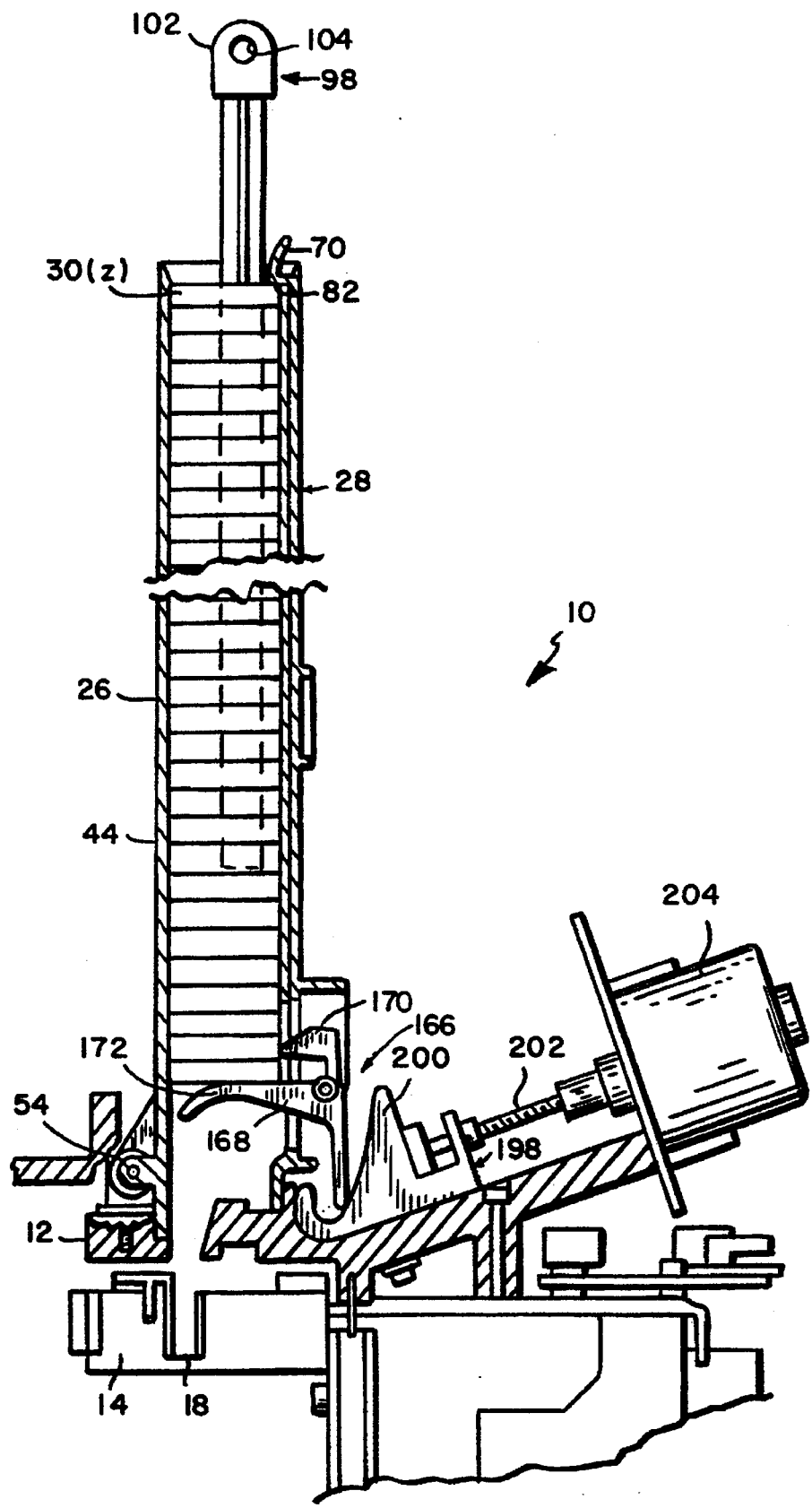
FIG. 9(c) is a side view partially in cross section of the cuvette feeder system with a carrier stick being retracted from the cassette during loading.

To operate feeder system 10, dual cassettes 30 must initially be loaded into at least one, and preferably both, channels 50 in cassette 24. FIGS. 9(a)–9(c) illustrate the process of loading dual cuvettes 30 into a channel 50.

In FIG. 9(a), cassette 24 is pivoted about hinge 54 to provide easier access to an upper opening 205 in the cassette. Pivoting the cassette 24 moves the lower end of second finger 174 out of slot 206 in the actuator hook 200 and moves the bottom end 66 of the cover away from the top of the bracket 12. Cassette 24 may however be loaded without pivoting. Cuvettes 30 have been previously loaded onto a carrier stick 86, the retaining tip 94 securing the cuvettes on the stick. The cuvettes may for example be shipped to a laboratory mounted on a stick 86. Handle 98 may be used to manually push the stick 86 containing the cuvettes into a channel 50 of the cassette 24. As the cuvettes are pushed in the cassette channel, the lip 82 on the corresponding catch 70 is cammed or pushed outward away from the channel.

In FIG. 9(b), the cassette is pivoted back over the conveyor 18. The lower end of second finger 174 is seated in the slot 206 and the bottom end 66 is resting on the top of bracket 12. At this time, the cuvettes on stick 86 are seated in one of the channels 50 with the bottom cuvette 30(a) resting against the top of the finger 172. The closed ends 36 face the base 44 and the open ends 34 face the cover 28. The corresponding catch 70 has returned to its original position and the side of the top cuvette 30(z) is seated below the lip 82. The retaining tip 94 extends below the first finger 172 and the handle 98 extends out above the other end 205 of the cassette.

In FIG. 9(c), the finger opening 104 in handle 102 is used to pull the carrier stick 86 out from the top of housing 26. Lip 82 prevents the top cuvette 30(z) and the rest of the cuvettes 30 below it from being pulled out with stick 86. As the stick is pulled out, tip 94 is deformed in passing through each cuvette gap 40. The row of cuvettes 30 released from the stick 86 are supported over the drop slot 22 by the finger 172.

While in the discussion above it has been assumed that the cassette is pivoted back to the position shown in FIGS. 9(b) and 9(c) once stick 86 is fully inserted, this could be performed earlier or later in the cuvette loading process. For example, in many applications, the preferred mode of operation is for the cassette to remain in the pivoted position shown in FIG. 9(a) until both channels of the cassette have been loaded with cuvettes and sticks 86 have been removed from both channels.

Once stick 86 has been completely withdrawn and the cassette is pivoted to the position shown in FIG. 9(c), the system is ready for operation. FIGS. 10(a)–10(c) illustrate the operation of one channel of cuvettes, the second channel operating in substantially the same way. The channels may be operated together to simultaneously feed cuvettes to conveyor 18 or may be operated separately.

In FIG. 10(a), finger 172 supports the substantially vertical row of cuvettes 30 in channel 50 of cassette 24. The tip 196 of the head. 190 extends into the opening 84 and is located adjacent the bridge 38 of the dual cuvette 30(b) above the bottom cuvette 30(a), but the tip 196 does not engage the bridge.

In FIG. 10(b), the actuator motor 204 has been activated in a direction to pull the hook 200 along bracket 12 towards the motor. Hook 200 pulls the lower end of finger 174 in a rearward direction to rotate lever 168 about pivot shaft 182 in the counterclockwise direction. Pulling finger 174 also pushes tip 196 against the bridge 38 of cuvette 30(b). This presses the closed ends 36 of cuvette 30(b) against cover base 44 bending the flexible finger 188 to frictionally support cuvette 30(b) in its existing position. The remaining cuvettes 30 are supported by cuvette 30(b). Rotating lever 170 rotates finger 172 in a counter clockwise direction, permitting bottom cuvette 30(a) to begin to slide down finger 172 to sloped tip 186.

Referring to FIG. 10(c), as the actuator motor continues to pull the lower end of finger 174, the distance between tip 186 and wall 44 increases, permitting cuvette 30(a) to slide down finger 172 towards drop slot 22. As the cuvette slides down finger 172, its orientation changes from horizontal to vertical with closed ends 36 of cuvette 30(a) facing downward toward drop slot 22. When the distance between tip 186 and base 44 becomes wide enough, bottom cuvette 30(a) slides past sloped tip 186, along the base 44, down through drop slot 22 and onto conveyor track 18.

Once the bottom cuvette 30(a) has been deposited, the direction of rotation of actuator motor 204 is reversed so that the motor is operative to rotate lead screw 202 in the opposite direction, causing the shaft to move in a direction to push on finger 174. This results in lever 170 being rotated in a clockwise direction.

As this operation continues, eventually, finger 174 is rotated to a position where finger 188 is insufficiently flexed for tip 196 to exert sufficient pressure on bridge 38 of cuvette 30(b) to support the cuvette stack. At this time finger 172 has returned to a substantially horizontal position. The row of cuvettes 30 drop down onto the finger 172 guided by the track 52 in the channel 50. The system is thus returned to the condition shown in FIG. 10(a) and the direction of rotation of motor 204 may then be reversed to feed the next cuvette 30.

Figure 11:
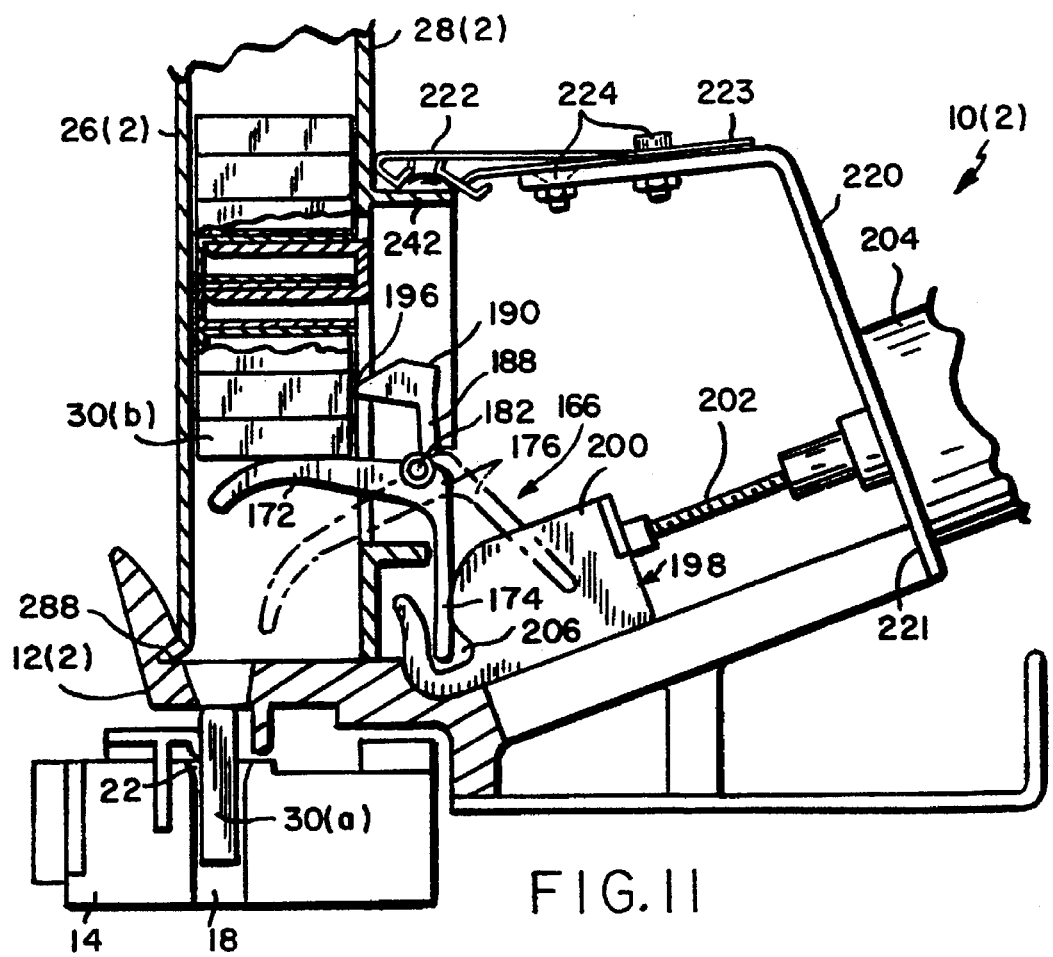
FIG. 11 is a cross-sectional side view of the cuvette feeder system in accordance with a second embodiment of the invention.
Figure 13A:
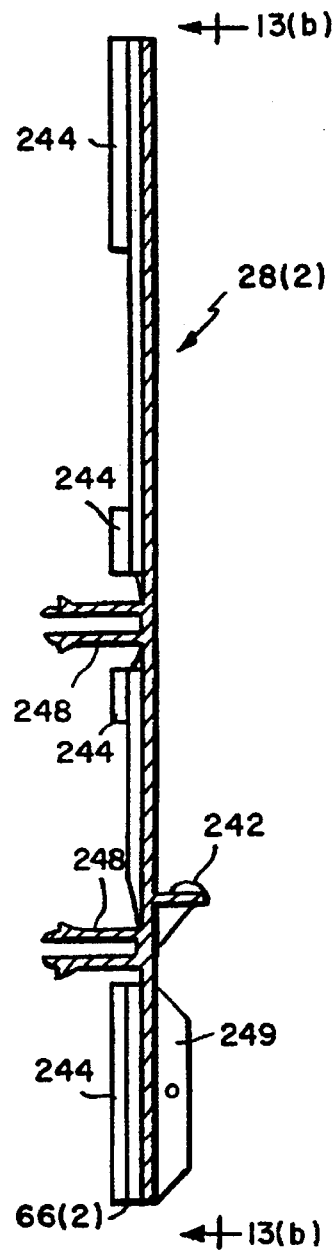
FIG. 13(a) is a side sectional view of a cover for the channel member shown in FIG. 12(a)–12(c).
Figure 13B:
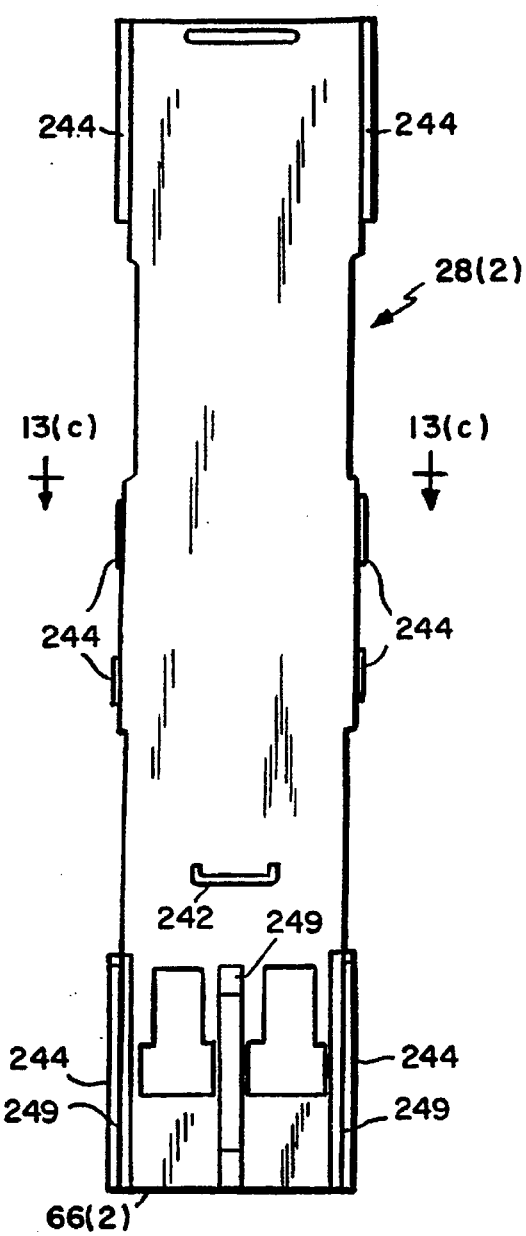
FIG. 13(b) is a front view of the cover taken generally along line 8—8 in FIG. 13(a).
Figure 13C:
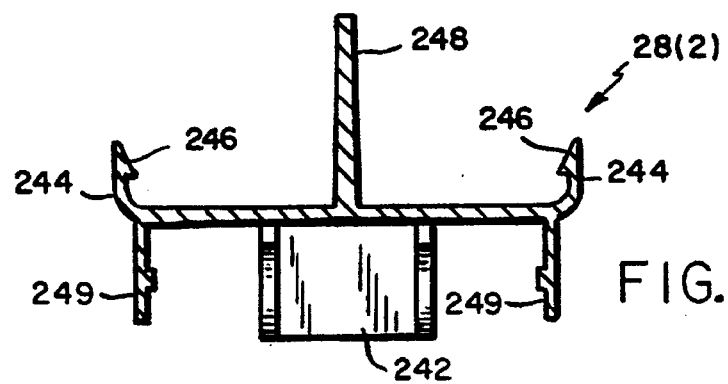
FIG. 13(c) is a top sectional view of the cover taken generally along line 9—9 in FIG. 13(b).

FIG. 11 is a cross-sectional side view of a cuvette feeder system 10(2) in accordance with a second embodiment of the invention. Corresponding elements in FIG. 11 have numeral designation which correspond to those numeral designations used in FIGS. 1–10 and will not be described again.

The principle difference between the systems 10 and 10(2) is that, rather than having a reusable cassette 24 with cuvettes being loaded into the cassette from sticks 86, the system 10(2) uses replaceable loaded cassettes 24(2). To permit the use of such cassettes, bracket 12(2) has a horizontal slot 218 adjacent one side of the drop slot 22 and an arm 220 extending from its rearward end. The arm 220 extends up and forward towards the cover 28. A leaf spring 222 is secured by a pair of screws 224 at the end of the arm 220. The remainder of the bracket 12 is substantially identical to the bracket 12 previously disclosed.

FIGS. 11 and 12(a)–12(c) provide various views of a channel member 26(2) for a cassette 24(2). Channel member 26(2) includes a top wall 226 which seals the top of the cassette to minimize the entry of dust and dirt. Top wall 226 is connected to the ends of side walls 42(2) and base 44(2). A horizontal slot 228 is cut into base 44(2) adjacent the top end of each track 52(2). Each track 52(2) has a vertical slot 229 cut through the track and base 44(2) which extends along the length of the track and terminates at the top in horizontal slot 228. Divider wall 48(2) extends out further than either track 52(2), but not as far as the side walls 42(2). A notch 230 is formed along the edge of divider wall 48(2) facing out of channel member 26(2). A ridge 232 and a groove 234 are formed on the outer surface of each side wall to facilitate connection to cover 28(2). A horizontal tab 238 extends from the lower end of the channel member. The remainder of the channel member is substantially the same as the channel member 26 previously described.

FIGS. 11 and 13(a)–13(c) illustrate a cover 28(2) for cassette 24(2). Cover 28(2) includes a horizontal shelf 242 extending perpendicularly to cover 28(2) which is adapted to engage with the bottom of the leaf spring 222.

Cover 28(2) also includes four pairs of fingers 244 which are adapted to coact with corresponding elements 232 and 234 on channel member 26(2) to latch the channel member and cover. Two pairs of fingers 244 are located on each elongated side of the cover. Each finger 244 has a protrusion 246 which can engage with the groove 234 on the housing.

Cover 28(2) also includes a pair of circular projections 248 which are connected to the middle of cover and extend far enough to be seated in corresponding openings 230 (FIG. 12(c)) in divider wall 48(2), when cover 28(2) is connected to channel member 26(2). The remainder of cover 28(2) is substantially identical to cover 28 previously disclosed.

To load feeder system 10(2) with dual cuvettes 30, each side of channel member 26(2) is filled with cuvettes 30. Once filled, cover 28(2) is placed over the housing and fingers 244 with the protrusion 246 snap into engagement with the grooves 234. Once cover 28(2) is in place, horizontal projection 238 (FIG. 12(a)), is snapped into the slot 218 and shelf 242 is placed below the leaf spring 222 to secure the cassette in the system.

For the FIG. 11 embodiment, escapement 166 is preferably mounted to the cassette as for the FIG. 1 embodiment with the lower end of the finger 174 disposed in slot 206 of the actuator hook. In the alternative, escapement 166 may be connected to the bracket 12. If the escapement is connected to bracket 12, then each finger 172 and triangular head 190 must be manually placed into the corresponding opening 84 in cover 28(2) when snapping in the cassette.

Figure 14A:
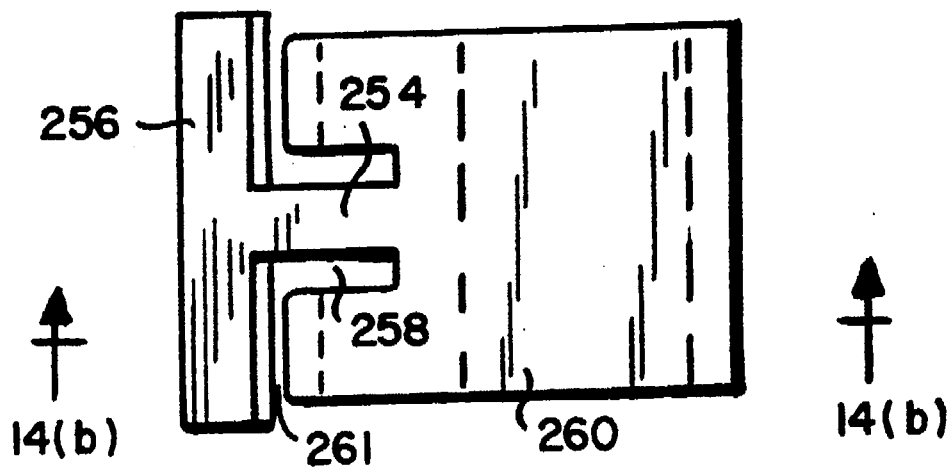
FIG. 14(a) is a top view of a follower used in the cuvette feeder system shown in FIG. 11.
Figure 14B:
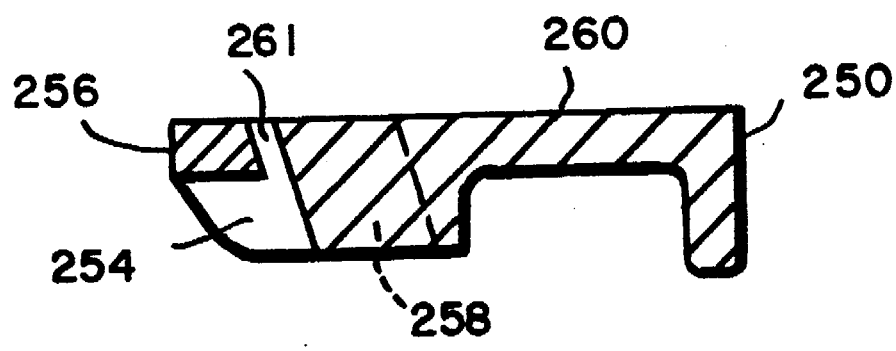
FIG. 14(b) is a side sectional view of the follower taken generally along the line 10—10 in FIG. 14(a).

A cuvette follower 250 depicted in FIGS. 14(a)–14(b) may be placed in a channel 50(2) at the top of a stack of cuvettes 30. The follower 250 has a T-shaped end formed from a neck 254 connected at one end to the middle of a horizontal member 256 and at the other end to the base of a slot 258 in a rectangular member 260. The horizontal member 256 fits in and through a horizontal slot 228 in channel member 26(2). With the horizontal member 256 on one side of base 44 and rectangular member 260 on the other side, the neck 254 of the follower rides down the vertical slot 229 of the track 52(2). As may be best seen in FIG. 14(b), the walls of members 256 and 260 on either side of the gap 261 therebetween are angled so that when member 260 tilts downward, as it would when the stack of cuvettes under it moves in that direction, base 44 and the walls of gap 261 are aligned, permitting the follower to slide downward with the cuvette stack. However, when the member 260 in the channel 50(2) is pushed upward, the walls of gap 261 frictionally engage base 44, preventing upward movement of the follower. The follower thus maintains the cuvettes in a channel 50(2) in the desired stack regardless of movement and orientation changes the filled cassette may experience during shipping and handling. Additionally, if the cassette 24 is made from clear material, the follower 250 provides a visual indication of the level of the cuvettes 30.

Figure 15:
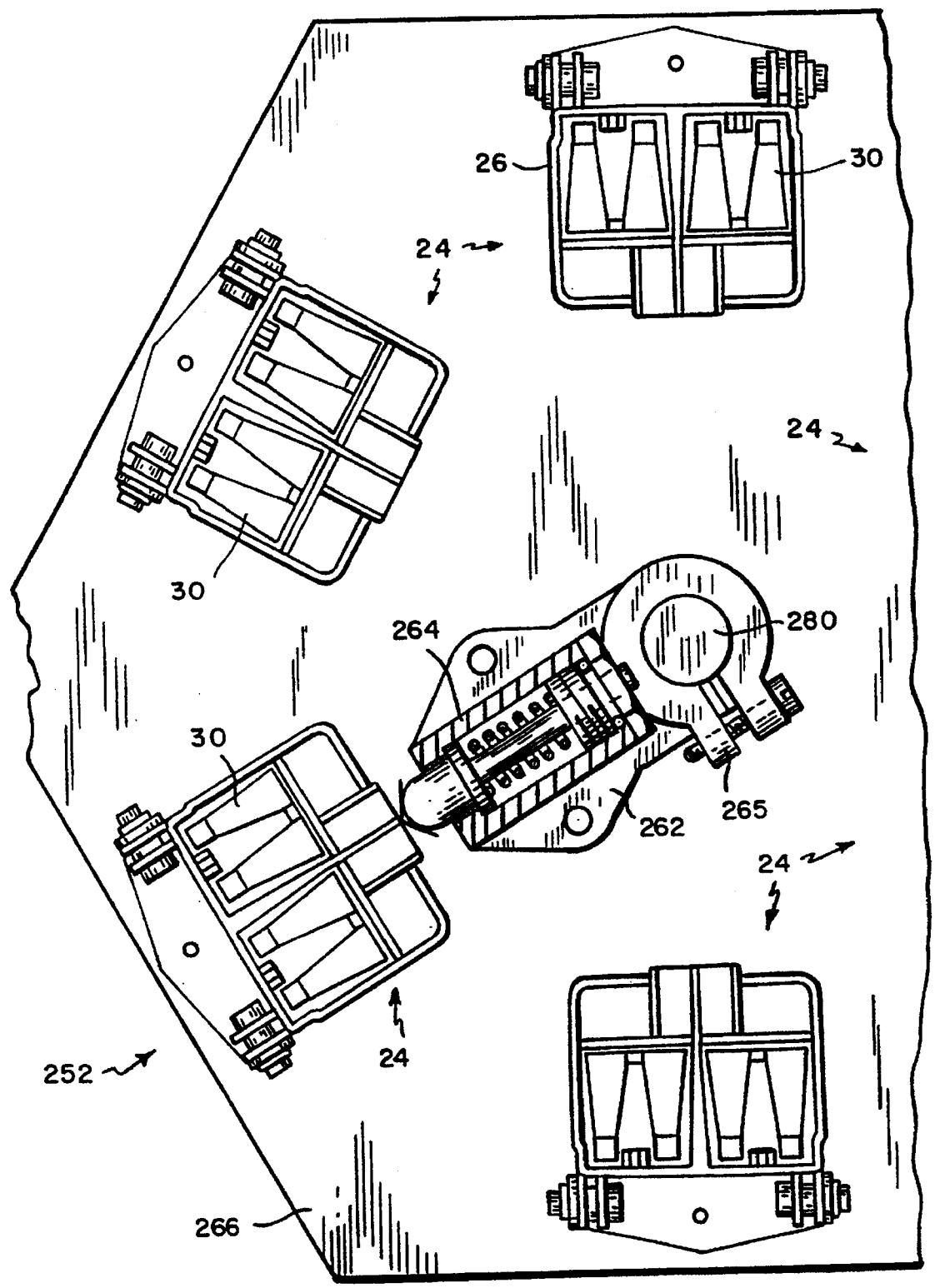
FIG. 15 is a top view of a rotating turret for use with the cuvette feeder system.
Figure 16:
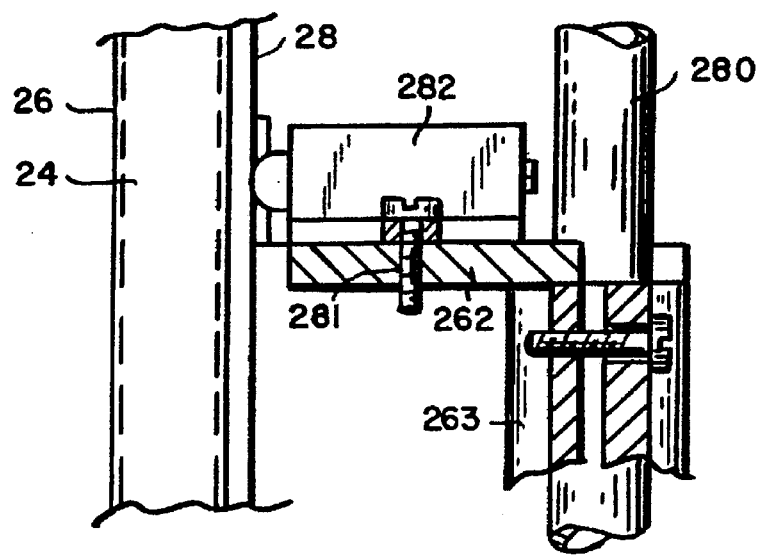
FIG. 16 is a fragmentary side view partially in sections of the rotating turret taken generally along the line 11—11 in FIG. 15.

FIG. 15 illustrates an embodiment for supplying cassettes 24 to the feeder system illustrated in either FIG. 1 or FIG. 11. In this embodiment, a rotating turret 252 is used to supply cassettes 24 filled with cuvettes to the system. Turret 252 includes a base 266 on which a plurality of cassettes 24 are mounted. For the embodiment show, the base is hexagonal with a cassette mounted at each of the six sides of the base (only four of which are shown in the figure). As previously discussed, each cassette includes an escapement mechanism 166 which for the embodiment shown is facing toward the center of the turret and each cassette may be filled with cuvettes. A common actuator mechanism 198 (not shown) is provided which may be mounted on a shaft 280 at the center of the turret. Actuator mechanism 198 would be as shown in the prior figures. Below actuator 198, a centering mechanism 282 is provided for aligning the actuator with the cassette 24 to be utilized. Centering mechanism 282 is mounted by a screw 281 to an arm 262 extending from a sleeve 263. For a preferred embodiment, actuator 198 and sleeve 263 are stationary and base 266 is rotated by shaft 280 to bring a new full cassette adjacent actuator 198 (and thus over conveyor 18) each time a cassette is emptied. Empty cassettes on base 266 may be reloaded (FIG. 1 embodiment) or replaced (FIG. 11 embodiment) while another cassette is in use. Alternatively, where there is a conveyor under each cassette, base 266 could be stationary and both actuator 198 and centering mechanism 282 could be secured to rotate with shaft 260. Further, if the cassettes are mounted on base 266 with covers 28 and escapements 160 facing outward rather than inward, actuator 198 would be suitably mounted on the outside of the turret. The operation for feeding cuvettes for all turret embodiments would be the same as that previously described for the FIG. 1 or FIG. 11 embodiments.

Figure 17:
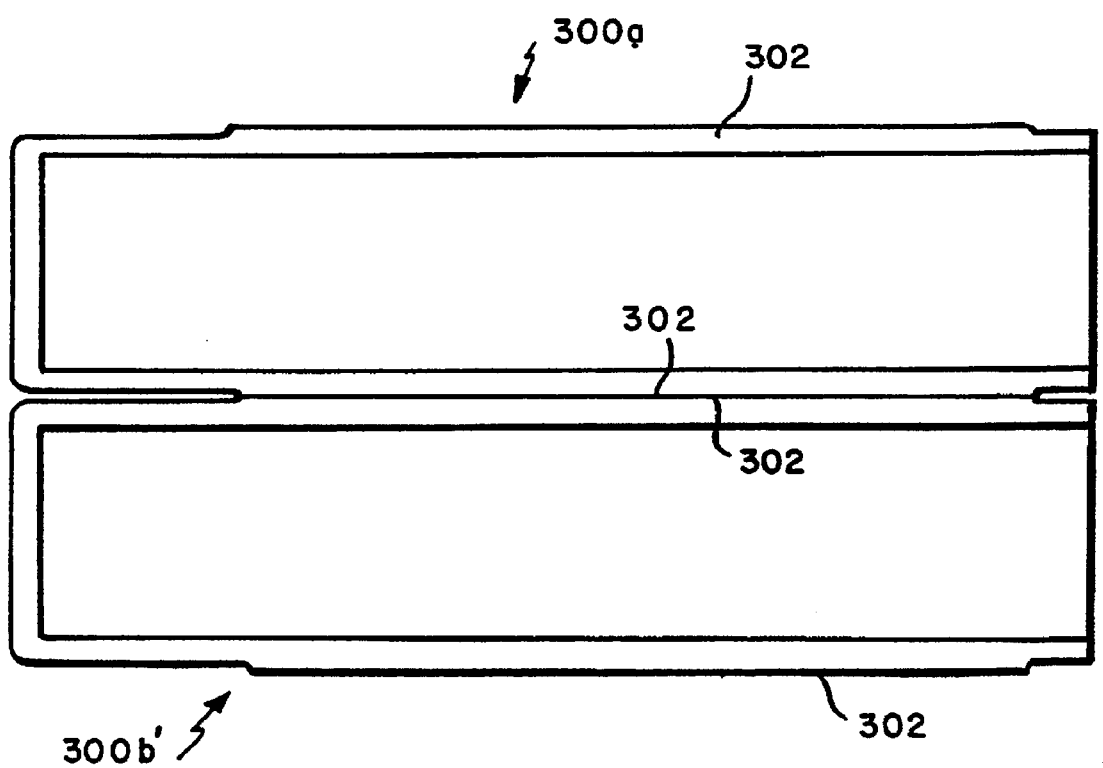
FIG. 17 is a side view of two stacked modified cuvettes.

FIG. 17 is an enlarged view of two cuvettes 300a and 300b which are assumed to be stacked in a cassette and are viewed in the same direction as for example in FIG. 1 or FIG. 11. These cuvettes are modified to provide a bulge 302 which is formed on each side of each vial of the cuvette. The depths of the bulges are relatively thin, typically being 0.001" to 0.003" and the width of the bulges in a direction in and out of the paper should be sufficient so that there is reasonable physical contact between the bulges 302 of adjacent cuvettes. The length of each bulge 302 (i.e. the dimension in a direction from left to right as viewed in FIG. 17) is sufficient so that when the cuvettes 300 are stacked, there is little or no wobbling of the cuvettes (i.e. rotation of the cuvettes in the plane of the paper in FIG. 17). This may be accomplished by having a single bulge of a fairly substantial length as shown in FIG. 17 or by having two or more spaced bulges at intervals along the facing walls of the cuvettes. The lengths of the bulges are limited at the bottom end of the cuvette by the fact that, for preferred embodiments, a window is provided at the lower end of the cuvette through which photo-optic readings of the contents of the cuvette may be taken and it is desired that the bulge not cover such window. At the upper end off the cuvette, it is desirable that the bulge be spaced some distance from the top so as to provide a gap at the top between cuvettes for reasons to be discussed shortly. For preferred embodiments, the contacting surfaces of bulges 302 are textured to inhibit relative movement between stacked cuvettes.

Bulges 302 are advantageous for a number of reasons. First, they serve to separate the cuvettes slightly at the top or open end. This prevents flash along this edge which frequently forms as a normal result of molding from hooking and interfering with feeding. The bulges also protect the optical windows by keeping the windows separated during shipping and handling on the sticks, for example sticks 88, or in the cassettes 24(2).

Having thus described the basic concept of the invention, it would be readily apparent to those skilled in the art that the foregoing detailed disclosure is intending to be presented by way of example only, and is not limiting. Various alterations, improvements, and modifications, including those discussed above, will occur to those skilled in the art, although not expressly stated herein. These modifications, alterations, and improvements are intended to be suggested hereby, and are within the spirit and scope of the invention. Accordingly, the invention is limited only by the following claims and equivalents thereto.

What is claimed is:

1. A stick for holding a plurality of stacked dual cuvettes for loading into a cassette, each cuvette having a pair of adjacent vials attached to each other at one end by a bridge, there being a selected space between adjacent walls of said vials, the stick comprising:

an elongated substantially flat shaft;

means, extending from said shaft along at least the length thereof to which cuvettes are to be mounted, for frictionally engaging the adjacent walls of each cuvette mounted on the stick, said means for frictionally engaging including at least one projection extending from each side of said shaft toward one of said adjacent walls;

a handle at one end of said shaft; and a temporary restraining tip at the opposite end of said shaft.

2. A stick for holding a plurality of stacked dual cuvettes for loading into a cassette, each cuvette having a pair of adjacent vials attached to each other at one end by a bridge, there being a selected space between adjacent walls of said vials, and at least one of said adjacent walls having indentations formed therein, the stick comprising:

an elongated shaft;

means, extending from said shaft along at least the length thereof to which cuvettes are to be mounted, for frictionally engaging the adjacent walls of each cuvette mounted on the stick, said means for frictionally engaging including means coacting with said indentation for providing a snap-fit between the stick and each cuvette mounted thereon;

a handle at one end of said shaft; and a temporary restraining tip at the opposite end of said shaft.

* * * * *